US012362560B2

(12) United States Patent
Turney et al.

(10) Patent No.: US 12,362,560 B2
(45) Date of Patent: *Jul. 15, 2025

(54) BUILDING ENERGY SYSTEM WITH PREDICTIVE CONTROL OF WATERSIDE AND AIRSIDE HVAC EQUIPMENT

(71) Applicant: Tyco Fire & Security GmbH, Neuhausen am Rheinfall (CH)

(72) Inventors: Robert D. Turney, Watertown, WI (US); Nishith R. Patel, Madison, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,715

(22) Filed: Apr. 19, 2024

(65) Prior Publication Data

US 2024/0266827 A1    Aug. 8, 2024

Related U.S. Application Data

(63) Continuation of application No. 18/205,311, filed on Jun. 2, 2023, now Pat. No. 11,973,345, which is a
(Continued)

(51) Int. Cl.
*H02J 3/00* (2006.01)
*F24F 11/47* (2018.01)
(Continued)

(52) U.S. Cl.
CPC ............. *H02J 3/003* (2020.01); *F24F 11/47* (2018.01); *F24F 11/56* (2018.01); *F24F 11/64* (2018.01);
(Continued)

(58) Field of Classification Search
None
See application file for complete search history.

(56) References Cited

U.S. PATENT DOCUMENTS

| 7,580,775 B2 | 8/2009 | Kulyk et al. |
| 7,894,946 B2 | 2/2011 | Kulyk et al. |

(Continued)

FOREIGN PATENT DOCUMENTS

| CA | 2957726 A1 | 3/2016 |
| CA | 3043996 A1 | 2/2018 |

(Continued)

OTHER PUBLICATIONS

Kwadzogah et al., "Model Predictive Control for HVAC Systems—A Review", 2013, 2013 IEEE International Conference on Automation Science and Engineering (CASE). (Year: 2013).*

(Continued)

*Primary Examiner* — Mohammad Ali
*Assistant Examiner* — Kelvin Booker
(74) *Attorney, Agent, or Firm* — Foley & Lardner LLP

(57) ABSTRACT

A predictive controller for a building energy system obtains a function that defines an amount of energy consumed by both waterside equipment and airside equipment during a time period as a summation of multiple equipment-specific energy components including a waterside energy component indicating an amount of energy consumed by the waterside equipment during the time period and an airside energy component indicating an amount of energy consumed by the airside equipment during the time period. The predictive controller performs a predictive control process using the function to determine values of the equipment-specific energy components during the time period. The predictive control process includes predicting the amount of energy consumed by both the waterside equipment and the airside
(Continued)

equipment during the time period based on the values of the equipment-specific energy components. The predictive controller operates the waterside equipment and the airside equipment using the values of the equipment-specific energy components.

20 Claims, 8 Drawing Sheets

Related U.S. Application Data continuation of application No. 17/080,583, filed on Oct. 26, 2020, now Pat. No. 11,705,726, which is a continuation of application No. 15/963,857, filed on Apr. 26, 2018, now Pat. No. 10,816,235.

(60) Provisional application No. 62/491,059, filed on Apr. 27, 2017.

(51) Int. Cl.
| | | |
|---|---|---|
| F24F 11/56 | (2018.01) | |
| F24F 11/64 | (2018.01) | |
| F24F 11/65 | (2018.01) | |
| F25B 27/00 | (2006.01) | |
| G05B 13/02 | (2006.01) | |
| G05B 13/04 | (2006.01) | |
| G05B 15/02 | (2006.01) | |
| G06Q 10/06 | (2023.01) | |
| G06Q 50/06 | (2024.01) | |
| H02J 3/32 | (2006.01) | |
| F24F 130/10 | (2018.01) | |
| F24F 140/60 | (2018.01) | |

(52) U.S. Cl.
CPC ............. *F24F 11/65* (2018.01); *F25B 27/00* (2013.01); *G05B 13/021* (2013.01); *G05B 13/048* (2013.01); *G05B 15/02* (2013.01); *G06Q 10/06* (2013.01); *G06Q 50/06* (2013.01); *H02J 3/32* (2013.01); *F24F 2130/10* (2018.01); *F24F 2140/60* (2018.01); *G05B 2219/2642* (2013.01); *H02J 2310/14* (2020.01)

(56) References Cited

U.S. PATENT DOCUMENTS

| | | | |
|---|---|---|---|
| 8,527,108 | B2 | 9/2013 | Kulyk et al. |
| 8,527,109 | B2 | 9/2013 | Kulyk et al. |
| 8,903,554 | B2 | 12/2014 | Stagner |
| 8,918,223 | B2 | 12/2014 | Kulyk et al. |
| 9,110,647 | B2 | 8/2015 | Kulyk et al. |
| 9,171,276 | B2 | 10/2015 | Steven et al. |
| 9,235,657 | B1 | 1/2016 | Wenzel et al. |
| 9,300,141 | B2 | 3/2016 | Marhoefer |
| 9,429,923 | B2 | 8/2016 | Ward et al. |
| 9,436,179 | B1 | 9/2016 | Turney et al. |
| 9,447,985 | B2 | 9/2016 | Johnson |
| 9,703,339 | B2 | 7/2017 | Kulyk et al. |
| 10,139,877 | B2 | 11/2018 | Kulyk et al. |
| 10,175,681 | B2 | 1/2019 | Wenzel et al. |
| 10,277,034 | B2 | 4/2019 | Marhoefer |
| 10,389,136 | B2 | 8/2019 | Drees |
| 10,761,547 | B2 | 9/2020 | Risbeck et al. |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 2007/0203860 | A1 | 8/2007 | Golden et al. |
| 2008/0000241 | A1 | 1/2008 | Larsen et al. |
| 2010/0268353 | A1 | 10/2010 | Crisalle et al. |
| 2012/0022702 | A1 | 1/2012 | Jang |
| 2012/0130556 | A1 | 5/2012 | Marhoefer |
| 2013/0162037 | A1 | 6/2013 | Kim et al. |
| 2013/0245847 | A1 | 9/2013 | Steven et al. |
| 2013/0346139 | A1 | 12/2013 | Steven et al. |
| 2014/0039709 | A1 | 2/2014 | Steven et al. |
| 2014/0094979 | A1 | 4/2014 | Mansfield |
| 2014/0163743 | A1 | 6/2014 | Kitajima |
| 2014/0188295 | A1 | 7/2014 | Saito et al. |
| 2014/0277761 | A1 | 9/2014 | Matsuoka et al. |
| 2014/0330611 | A1 | 11/2014 | Steven et al. |
| 2014/0330695 | A1 | 11/2014 | Steven et al. |
| 2014/0365017 | A1 | 12/2014 | Hanna et al. |
| 2015/0088576 | A1 | 3/2015 | Steven et al. |
| 2015/0094968 | A1 | 4/2015 | Jia et al. |
| 2015/0176848 | A1 | 6/2015 | Jung et al. |
| 2015/0267932 | A1 | 9/2015 | Kim et al. |
| 2015/0277467 | A1 | 10/2015 | Steven et al. |
| 2015/0292777 | A1 | 10/2015 | Okano |
| 2015/0316902 | A1 | 11/2015 | Wenzel et al. |
| 2015/0316907 | A1 | 11/2015 | Elbsat et al. |
| 2015/0316946 | A1* | 11/2015 | Wenzel ................ G05B 15/02 |
| 2015/0378381 | A1 | 12/2015 | Tinnakornsrisuphap et al. |
| 2016/0091904 | A1 | 3/2016 | Horesh et al. |
| 2016/0098022 | A1* | 4/2016 | Wenzel ................ G05B 15/02 |
| | | | 700/275 |
| 2016/0146491 | A1 | 5/2016 | Ettl et al. |
| 2016/0172859 | A1 | 6/2016 | Marhoefer |
| 2016/0180474 | A1 | 6/2016 | Steven et al. |
| 2016/0195866 | A1* | 7/2016 | Turney ................ G05B 23/02 |
| | | | 700/291 |
| 2016/0203569 | A1 | 7/2016 | Forbes et al. |
| 2016/0245539 | A1 | 8/2016 | Motomura et al. |
| 2016/0305678 | A1 | 10/2016 | Pavlovski et al. |
| 2016/0313751 | A1* | 10/2016 | Risbeck ................ G05B 15/02 |
| 2016/0322835 | A1 | 11/2016 | Carlson et al. |
| 2016/0327295 | A1 | 11/2016 | Ward et al. |
| 2016/0377306 | A1* | 12/2016 | Drees ........................ H02J 3/28 |
| | | | 700/295 |
| 2017/0030598 | A1 | 2/2017 | Burns et al. |
| 2017/0031962 | A1* | 2/2017 | Turney ............... G05D 23/1905 |
| 2017/0102162 | A1* | 4/2017 | Drees ..................... F24F 11/523 |
| 2017/0102675 | A1 | 4/2017 | Drees |
| 2017/0103483 | A1* | 4/2017 | Drees ................ G06Q 10/06315 |
| 2017/0104337 | A1 | 4/2017 | Drees |
| 2017/0104343 | A1 | 4/2017 | Elbsat et al. |
| 2017/0104449 | A1 | 4/2017 | Drees |
| 2017/0192400 | A1* | 7/2017 | Hofschulz .............. G01D 11/00 |
| 2017/0234559 | A1 | 8/2017 | Federspiel et al. |
| 2017/0237259 | A1 | 8/2017 | Youn et al. |
| 2017/0350625 | A1 | 12/2017 | Burns et al. |
| 2018/0004171 | A1* | 1/2018 | Patel ...................... G05B 17/02 |
| 2018/0004172 | A1* | 1/2018 | Patel ...................... G05B 15/02 |
| 2018/0100668 | A1 | 4/2018 | Huang |
| 2018/0175660 | A1 | 6/2018 | Hara |
| 2018/0180337 | A1 | 6/2018 | Luo et al. |
| 2018/0195741 | A1 | 7/2018 | Field et al. |
| 2018/0196456 | A1 | 7/2018 | Elbsat |
| 2018/0197253 | A1 | 7/2018 | Elbsat et al. |
| 2018/0224814 | A1 | 8/2018 | Elbsat et al. |
| 2018/0285800 | A1 | 10/2018 | Wenzel et al. |
| 2018/0340700 | A1 | 11/2018 | Chen et al. |
| 2018/0372362 | A1 | 12/2018 | Turney et al. |
| 2019/0052120 | A1 | 2/2019 | Huang et al. |
| 2019/0115785 | A1 | 4/2019 | Kallamkote et al. |
| 2020/0059098 | A1 | 2/2020 | Dong et al. |
| 2022/0268471 | A1 | 8/2022 | Turney et al. |
| 2024/0192647 | A1* | 6/2024 | Risbeck ............... G05B 13/048 |

FOREIGN PATENT DOCUMENTS

| | | |
|---|---|---|
| CN | 1161753 A | 10/1997 |
| CN | 104279715 A | 1/2015 |
| CN | 104319766 A | 1/2015 |
| CN | 104898422 A | 9/2015 |
| EP | 3 186 687 A4 | 7/2017 |
| EP | 3 497 377 A1 | 6/2019 |
| JP | 2005-092584 A | 4/2005 |
| JP | 2012-080679 A | 4/2012 |

(56) References Cited

FOREIGN PATENT DOCUMENTS

| | | | | |
|---|---|---|---|---|
| JP | 2013-142494 A | 7/2013 | | |
| JP | 2014-027784 A | 2/2014 | | |
| JP | 2014-047989 A | 3/2014 | | |
| JP | 2014-096946 A | 5/2014 | | |
| WO | WO-2016201353 A1 * | 12/2016 | ............ | G05B 15/02 |
| WO | WO-2018005180 A1 * | 1/2018 | ............ | F24F 11/30 |

OTHER PUBLICATIONS

Patel, "Distributed Economic Model Predictive Control for Large-Scale Building Temperature Regulation", 2016 AACC. (Year: 2016).*
Liang et al., "MPC control for improving energy efficiency of a building air handler for multi-zone VAVs", Feb. 2015, Building and Environment 92 (2015). (Year: 2015).*
Xu et al., "Robust MPC for temperature control of air-conditioning systems concerning on constraints and multitype uncertainties", 2010, Building Serv. Eng. Res. Technol. 31,1 (2010) pp. 39-55. (Year: 2010).*
Ge et al., "Model-based optimal control of a dedicated outdoor air-chilled ceiling system using liquid desiccant and membrane-based total heat recovery", Dec. 2010, Applied Energy 88 (2011) 4180-4190. (Year: 2010).*
Fong et al., "HVAC system optimization for energy management by evolutionary programming", Dec. 2004, Energy and Buildings 38 (2006) 220-231. (Year: 2004).*
Afram et al., "Theory and Application of HVAC Control Systems—A review of Model Predictive Control (MPC)," Building and Environment, Feb. 2014, vol. 72 (pp. 343-355).
Astrom, K., "Optimal Control of Markov Decision Processes with Incomplete State Estimation," Journal of Mathematical Analysis and Applications, Feb. 1965, vol. 10, No. 1 (pp. 174-205).
Berggren et al., LCE analysis of buildings—Taking the step towards Net Zero Energy Buildings, Nov. 30, 2012 , Energy and Buildings 62 (2013) 381-391. (Year: 2012).
Bittanti, S. et al., Adaptive Control of Linear Time Invariant Systems: The "Bet on the Best" Principle, Communications in Information and Systems, 2006, vol. 6, No. 4 (pp. 299-320).
Calma, "Tesla promises cars that connect to the grid, even if Elon Musk doesn't really want them to," The Verge, Sep. 23, 2020, https://www.theverge.com/2020/9/23/21451642/tesla-ev-electric-vehicle-energy-grid-battery-day-elon-musk; retrieved from the internet May 1, 2023 (7 pages).
Carrasco et al., Power Electronic Systems for the Grid Interaction of Renewable Energy Sources: a Survey, Jun. 2006, IEEE Transactions on Industrial Electronics, vol. 53 Iss. 4, Year 2006.
Cellura et al., Energy life-cycle approach in Net zero energy buildings balance: Cross Mark Operation and embodied energy of an Italian case study, May 4, 2013, Energy and Buildings 72 (2014) 371 -381. (Year: 2013).
Chen et al., "Control-oriented System Identification: an H1 Approach," Wiley-Interscience, 2000, vol. 19, Chapters 3 & 8 (38 pages).
CN Office Action on CN Appl. Ser. No. 201780040984.8, dated Dec. 16, 2020 (16 pages).
CN Office Action on CN Appl. Ser. No. 201780040984.8, dated Mar. 25, 2020 (19 pages).
CN Office Action on CN Appl. Ser. No. 201780041246.5 dated Jul. 11, 2022 (10 pages).
CN Office Action on CN Appl. Ser. No. 201780041246.5 dated Mar. 3, 2022 (25 pages).
CN Office Action on CN Appl. Ser. No. 201780041246.5 dated May 17, 2021 (27 pages).
Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Cordiner et al., A study on the energy management in domestic micro-grids based on Model Predictive Control strategies, Feb. 25, 2015, Energy Conversion and Management 102 (2015) 50-58, (Year 2015).
Delbert, "Tesla's Virtual Power Plant Is Already a Success, And it's only getting bigger," Popular Mechanics, Apr. 10, 2020, https://www.popularmechanics.com/science/a31977069/tesla-virtual-power-plant/; retrieved from the internet May 1, 2023 (7 pages).
Feng, J. et al., "Model Predictive Control of Radiant Slab Systems with Evaporative Cooling Sources," Energy and Buildings, 2015, 87 (pp. 199-210).
Ferrarini et al., "A Distributed Model Predictive Control approach for the integration of flexible loads, storage and renewables," IEEE, 2014 (6 pages).
Fong et al., "HVAC system optimization for energy management by evolutionary programming," Energy and Buildings, 2006, vol. 38 (pp. 220-231).
Gelazanskas et al., Demand side management in smart grid: A review and proposals for future direction, Sustainable Cities and Society 11, Year 2014, pp. 22-30.
George et al., "Time Series Analysis: Forecasting and Control", Fifth Edition, John Wiley & Sons, 2016, Chapters 4-7 and 13-15, 183 pages.
Haase et al., "A Survey of Adaptive Systems Supporting Green Energy in the Built Environment," Nov. 9-12, 2015, IECON, Yokohama (6 pages).
Hamdy et al., A multi-stage optimization method for cost-optimal and nearly-zero-energy building solutions in line with the EPBD-recast 201 O, Apr. 4, 2012, Energy and Bui ldings 56 (2013) 189-203. (Year: 2012).
Hardt, M. et al., "Gradient Descent Learns Linear Dynamical Systems", Journal of Machine Learning Research, 2018, 19 (pp. 1-44).
Helmicki, A. et al. "Control Oriented System Identification: a Worst-case/deterministic Approach in H1," IEEE Transactions on Automatic Control, 1991, 36.10 (pp. 1163-1176).
Homer Energy, "Homer Grid: How Grid Calculates Demand Charge and Energy Bills Savings," URL: https://www.homerenergy.com/products/grid/docs/latest/how_grid_calculates_demand_charge_and_energy_bills_savings.html, retrieved Dec. 2020, 1 page.
Homer Energy, "Homer Grid: Solving Problems with Homer Software," URL:https://www.homerenergy.com/products/grid/docs/latest/solving_problems_with_homer_software.html, retrieved Dec. 2019, 1 page.
Homer Energy, "Homer Grid: Welcome to Homer Grid," URL: https://www.homerenergy.com/products/grid/docs/latest/index.html, retrieved Dec. 2020, 1 page.
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
International Search Report and Written Opinion on PCT Appl. Ser. No. PCT/US2017/039798 dated Sep. 15, 2017 (15 pages).
International Search Report and Written Opinion on PCT Appl. Ser. No. PCT/US2017/039937 dated Sep. 21, 2017 (16 pages).
International Search Report and Written Opinion on PCT Appl. Ser. No. PCT/US2018/029625 dated Aug. 2, 2018 (15 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-

(56) References Cited

OTHER PUBLICATIONS

Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automat ion_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
JP Office Action for JP Appl. Ser. No. 2022-157487 dated Jan. 9, 2024 (14 pages).
JP Office Action on JP Appl. Ser. No. 2018-567668 dated Jun. 7, 2022 (12 pages).
JP Office Action on JP Appl. Ser. No. 2018-567668 dated Nov. 30, 2021 (6 pages).
JP Office Action on JP Appl. Ser. No. 2018-567668, dated Mar. 9, 2021 (10 pages).
JP Office Action on JP Appl. Ser. No. 2018-567674 dated Mar. 2, 2021 (8 pages).
JP Office Action on JP Appl. Ser. No. 2022-15566 dated Jul. 4, 2023 (32 pages).
Kelman, A. et al., "Bilinear Model Predictive Control of a HVAC System Using Sequential Quadratic Programming", Proceedings of the IFAC World Congress, Sep. 2, 2011 (6 pages).
Kingma, D. et al., "Adam: A Method for Stochastic Optimization", International Conference on Learning Representations (ICLR), 2015, 15 pages.
Kuraura, Takeshi, "Transition of Variable Refrigerative Flow," Japan Society of Refrigerating and Air Conditioning Engineers, Sep. 2010, vol. 85, No. 995 (6 pages).
Kusiak et al., "Cooling output optimization of an air handling unit," Applied Energy, 2010, vol. 87 (pp. 901-909).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
Lambert, "Honda is working on bi-directional charging technology for its electric vehicles, installs station at HQ," Elektrek, Dec. 7, 2017, https://electrek.co/2017/12/07/honda-bi-directional-charging-technology-electric-vehicles/;retrieved from the internet May 1, 2023 (6 pages).
Lambert, "Nissan launches 'Nissan Energy' to commercialize vehicle-to-home/building with the Leaf," Elektrek, Nov. 28, 2018, https://electrek.co/2018/11/28/nissan-energy-leaf-vehicle-to-home-building/, retrieved from the internet May 1, 2023 (8 pages).
Lambert, "Tesla announces unlimited overnight charging for $30 per month," Elektrek, Mar. 1, 2023, https://electrek.co/2023/03/01/tesla-unlimited-overnight-charging-30-month/; retrieved from the internet May 1, 2023 (6 pages).
Lambert, "Tesla launches new feature to help solar homeowners charge with excess solar power," Elektrek, Mar. 16, 2023, https://electrek.co/2023/03/16/tesla-launches-feature-help-solar-homeowners-charge-excess-solar-power/; retrieved form the internet May 1, 2023 (6 pages).
Lazic, N. et al., "Data center cooling using model-predictive control", 32nd Conference on Neural Information Processing Systems, 2018, 10 pages.

(56) References Cited

OTHER PUBLICATIONS

Li et al., Zero energy buildings and sustainable development implications—A review, Aug. 28, 2012, Energy 54 (2013) 1-10. (Year: 2012).

Ljung (ed.), "System Identification: Theory for the User", 2nd Edition, Prentice Hall, Upper Saddle River, New Jersey, 1999, Chapters 5 and 7, 40 pages.

Ljung et al., "Theory and Practice of Recursive Identification," vol. 5. JSTOR, 1983, Chapters 2, 3 & 7, 80 pages.

Lopatto, "I went to Australia to test out Tesla's vision of the future," The Verge, Jun. 25, 2019, https://www.theverge.com/2019/6/25/18715585/tesla-australia-renewable-energy-houses-electrical-grid-battery-installation; retrieved from the internet May 1, 2023 (22 pages).

Lu et al., Design optimization and optimal control of grid-connected and standalone nearly/net zero energy buildings, Apr. 21, 2015, Applied Energy 155 (2015) 463-477. (Year: 2015).

Lyons, "Here are Tesla's biggest announcements from Battery Day," The Verge, Sep. 22, 2020, https://www.theverge.com/2020/9/22/21450840/tesla-battery-day-production-elon-musk-tabless-range-cathode-cobalt-plaid; retrieved for the internet on May 1, 2023 (6 pages).

Ma et al., "Predictive Control for Energy Efficient Buildings with Thermal Storage: Modeling, Stimulation, and Experiments", IEEE Control Systems, Feb. 2012, vol. 32, No. 1 (21 pages).

Ma, Y. et al., "Model Predictive Control for the Operation of Building Cooling Systems", IEEE Transactions on Control Systems Technology, May 2012, 20:3, pp. 796-803.

Ma, Y. et al., "Predictive Control for Energy Efficient Buildings with Thermal Storage: Modeling, Stimulation, and Experiments", IEEE Control Systems, Feb. 2012, 32.1 (pp. 44-64).

Mohamed et al., "Real-time energy management scheme for hybrid renewable energy systems in smart grid applications," Electric Power Systems Research, 2013, vol. 96 (pp. 133-143).

Morosan et al., Building temperature regulation using a distributed model predictive control, Energy and Buildings, Sep. 1, 2010, (10 pages).

Patel et al., "A Case Study of Economic Optimization of HVAC Systems based on the Stanford University Campus Airside and Waterside Systems", Jul. 2018, Purdue University Purdue, International High Performance Buildings (12 pages).

Pikas et al., "Cost optimal and nearly zero energy building solutions for office buildings", Aug. 27, 2013, Energy and Buildings 74 (2014) 30-42. (Year: 2013).

Prodan et al., "A model predictive control framework for reliable microgrid energy management," Electrical Power and Energy Systems, 2014, vol. 61 (pp. 399-409).

Rahmani-Andebili et al., "Energy Scheduling for a Smart Home Applying Stochastic Model Predictive Control," IEEE, 2016 (6 pages).

Ramchurn et al., "Agent-Based Homeostatic Control for Green Energy in the Smart Grid," CM Transactions on Intelligent Systems and Technology, Jul. 2011, vol. 2, No. 4, Article 35 (28 pages).

Rottondi et al., "An Energy Management System for a Smart Office Environment," Institute of Electrical and Electronics Engineers (IEEE), 2015 (6 pages).

Serale et al., "Model Predictive Control (MPC) for Enhancing Building and HVAC System Energy Efficiency: Problem Formulation, Applications and Opportunities", Energies, Feb. 13, 2018, vol. 11, No. 631 (35 pages).

Shahan, "Tesla CTO JB Straubel On Why EVs Selling Electricity To The Grid Is Not As Swell As It Sounds," Clean Technica, Aug. 22, 2016, https://cleantechnica.com/2016/08/22/vehicle-to-grid-used-ev-batteries-grid-storage/; retrieved from the internet May 1, 2023 (13 pages).

Tesla—"How Powerwall Works" tesla.com, Publication Date: Unknown; first date this website was archived on the Wayback Machine was May 13, 2020, https://www.tesla.com/support/energy/powerwall/learn/how-powerwall-works; retrieved from the internet on May 1, 2023 (4 pages).

Vijayakumar et al., "A real-time management and evolutionary optimization scheme for a secure and flexible smart grid towards sustainable energy," Electrical Power and Energy Systems, 2014, vol. 62 (pp. 540-548).

Walton, "Tesla software update allows Powerwall 2 owners to optimize for time-varying rates," Utility Dive, May 15, 2018, https://www.utilitydive.com/news/tesla-software-update-allows-powerwall-2-owners-to-optimize-for-time-varyin/523588/; retrieved from the internet May 1, 2023 (4 pages).

Zacekova et al., "Towards the real-life implementation of MPC for an office building: Identification issues," Applied Energy, 2014, vol. 135 (pp. 53-62).

Zhao et. al., "An Energy Management System for Building Structures Using a Multi-Agent Decision-Making Control Methodology," IEEE Transactiona on Industry Applications, vol. 49, No. 1, Jan./Feb. 2013, pp. 322-330.

Zong et al., "Model Predictive Controller for Active Demand Side Management with PV Self-consumption in an Intelligent Building," 3rd IEEE PES Innovative Smart Grid Technologies Europe (ISGT Europe), Berlin, 2012 (8 pages).

* cited by examiner

BUILDING ENERGY SYSTEM WITH PREDICTIVE CONTROL OF WATERSIDE AND AIRSIDE HVAC EQUIPMENT

CROSS-REFERENCE TO RELATED PATENT APPLICATIONS

This application is a continuation of U.S. patent application Ser. No. 18/205,311 filed Jun. 2, 2023, which is a continuation of U.S. patent application Ser. No. 17/080,583 filed Oct. 26, 2020 (now U.S. Pat. No. 11,705,726), which is a continuation of U.S. patent application Ser. No. 15/963,857 filed Apr. 26, 2018 (now U.S. Pat. No. 10,816,235), which claims the benefit of and priority to U.S. Provisional Patent Application No. 62/491,059 filed Apr. 27, 2017, all of which are incorporated by reference herein in their entireties.

BACKGROUND

The present disclosure relates generally to a building energy system and more particularly to a building energy system with predictive control. A building energy system may provide energy to a campus that includes one or more buildings and/or a central plant. The buildings may include various types of building equipment (e.g., air handling units, rooftop units, chillers, boilers, etc.) configured to provide heating and/or cooling to the buildings. The central plant may include various types of central plant equipment (e.g., a chiller subplant, a heater subplant, a cooling tower subplant, etc.) configured to generate a heated fluid or chilled fluid for use in heating or cooling the buildings.

In some building energy systems, it may be desirable to store electric energy (i.e., electricity) in batteries and discharge the stored electric energy for use in powering the campus. For example, the batteries can be used to store energy during time periods when energy prices are low and discharge the stored energy when energy prices are high to reduce the cost of energy purchased from an energy grid. However, it can be difficult to optimize the amount of electric energy stored in the batteries or discharged from the batteries. This difficulty is increased when green energy generation (e.g., a photovoltaic field, a wind turbine array, etc.) is used to supplement the energy purchased from the energy grid. It would be desirable to provide a building energy system that addresses these and other difficulties of conventional systems.

SUMMARY

One implementation of the present disclosure is a building energy system including HVAC equipment, green energy generation, a battery, and a predictive controller. The HVAC equipment are configured to provide heating or cooling for a building. The green energy generation is configured to collect green energy from a green energy source. The battery is configured to store electric energy including at least a portion of the green energy provided by the green energy generation and grid energy purchased from an energy grid and configured to discharge the stored electric energy for use in powering the HVAC equipment. The predictive controller is configured to generate a constraint that defines a total energy consumption of the HVAC equipment at each time step of an optimization period as a summation of multiple source-specific energy components. The source-specific energy components include a grid energy component indicating an amount of the grid energy to purchase from the energy grid during the time step, a green energy component indicating an amount of the green energy provided by the green energy generation during the time step, and a battery energy component indicating an amount of the electric energy to store in the battery or discharge from the battery during the time step. The predictive controller is configured optimize the predictive cost function subject to the constraint to determine values for each of the source-specific energy components at each time step of the optimization period.

In some embodiments, the battery energy component adds to the grid energy component and the green energy component when the amount of the electric energy is discharged from the battery during the time step and subtracts from the grid energy component and the green energy component when the amount of the electric energy is stored in the battery during the time step.

In some embodiments, the predictive cost function accounts for a cost of the grid energy purchased from the energy grid at each time step of the optimization period and a cost savings resulting from discharging the stored electric energy from the battery at each time step of the optimization period.

In some embodiments, the predictive controller is configured to receive energy pricing data defining a cost per unit of the grid energy purchased from the energy grid at each time step of the optimization period and use the energy pricing data as inputs to the predictive cost function.

In some embodiments, the HVAC equipment include waterside equipment of a central plant and airside equipment within a building. In some embodiments, the predictive cost function accounts for a cost of energy consumed by both the waterside equipment and the airside equipment at each time step of the optimization period.

In some embodiments, the predictive controller is configured to generate a second constraint that defines the total energy consumption of the HVAC equipment at each time step as a summation of multiple equipment-specific energy components including a waterside energy component indicating an amount of energy consumed by the waterside equipment during the time step and one or more airside energy components indicating one or more amounts of energy consumed by the airside equipment during the time step. In some embodiments, the predictive controller is configured to optimize the predictive cost function subject to the second constraint to determine values for each of the equipment-specific energy components at each time step of the optimization period.

In some embodiments, the one or more airside energy components include at least one of an air handler unit (AHU) energy component indicating an amount of energy consumed by one or more AHUs of the building at each time step or a rooftop unit (RTU) energy component indicating an amount of energy consumed by one or more TRUs of the building at each time step.

In some embodiments, the predictive cost function accounts for a demand charge based on a maximum power consumption of the building energy system during a demand charge period that overlaps at least partially with the optimization period. In some embodiments, the predictive controller is configured to receive energy pricing data defining the demand charge and to use the energy pricing data as inputs to the predictive cost function.

In some embodiments, the predictive controller includes an economic controller configured to determine optimal power setpoints for the HVAC equipment and for the battery at each time step of the optimization period, a tracking controller configured to use the optimal power setpoints to determine optimal temperature setpoints for one or more building zones at each time step of the optimization period, and an equipment controller configured to use the optimal temperature setpoints to generate control signals for the HVAC equipment and for the battery at each time step of the optimization period.

In some embodiments, the building energy system includes a battery power inverter operable to control the amount of the electric energy stored in the battery or discharged from the battery during each time step. In some embodiments, the predictive controller is configured to operate the battery power inverter to cause the battery to store or discharge the amount of the electric energy indicated by the battery energy component at each time step.

Another implementation of the present disclosure is a method for controlling a building energy system. The method includes operating HVAC equipment to provide heating or cooling for a building and collecting green energy from a green energy source at green energy generation. The method includes storing, in a battery, electric energy comprising at least a portion of the green energy collected by the green energy generation and grid energy purchased from an energy grid and discharging, from the battery, the stored electric energy for use in powering the HVAC equipment. The method includes generating a constraint that defines a total energy consumption of the HVAC equipment at each time step of an optimization period as a summation of multiple source-specific energy components. The source-specific energy components include a grid energy component indicating an amount of the grid energy to purchase from the energy grid during the time step, a green energy component indicating an amount of the green energy provided by the green energy generation during the time step, and a battery energy component indicating an amount of the electric energy to store in the battery or discharge from the battery during the time step. The method includes optimizing the predictive cost function subject to the constraint to determine values for each of the source-specific energy components at each time step of the optimization period.

In some embodiments, the battery energy component adds to the grid energy component and the green energy component when the amount of the electric energy is discharged from the battery during the time step and subtracts from the grid energy component and the green energy component when the amount of the electric energy is stored in the battery during the time step.

In some embodiments, the predictive cost function accounts for a cost of the grid energy purchased from the energy grid at each time step of the optimization period and a cost savings resulting from discharging the stored electric energy from the battery at each time step of the optimization period.

In some embodiments, the method includes receiving energy pricing data defining a cost per unit of the grid energy purchased from the energy grid at each time step of the optimization period and using the energy pricing data as inputs to the predictive cost function.

In some embodiments, the HVAC equipment include waterside equipment of a central plant and airside equipment within a building. In some embodiments, the predictive cost function accounts for a cost of energy consumed by both the waterside equipment and the airside equipment at each time step of the optimization period.

In some embodiments, the method includes generating a second constraint that defines the total energy consumption of the HVAC equipment at each time step as a summation of multiple equipment-specific energy components including a waterside energy component indicating an amount of energy consumed by the waterside equipment during the time step and one or more airside energy components indicating one or more amounts of energy consumed by the airside equipment during the time step. In some embodiments, the method includes optimizing the predictive cost function subject to the second constraint to determine values for each of the equipment-specific energy components at each time step of the optimization period.

In some embodiments, the one or more airside energy components include at least one of an air handler unit (AHU) energy component indicating an amount of energy consumed by one or more AHUs of the building at each time step or a rooftop unit (RTU) energy component indicating an amount of energy consumed by one or more TRUs of the building at each time step.

In some embodiments, the predictive cost function accounts for a demand charge based on a maximum power consumption of the building energy system during a demand charge period that overlaps at least partially with the optimization period. In some embodiments, the method includes receiving energy pricing data defining the demand charge and to using the energy pricing data as inputs to the predictive cost function.

In some embodiments, optimizing the predictive cost function includes determining optimal power setpoints for the HVAC equipment and for the battery at each time step of the optimization period. In some embodiments, the method includes using the optimal power setpoints to determine optimal temperature setpoints for one or more building zones at each time step of the optimization period and using the optimal temperature setpoints to generate control signals for the HVAC equipment and for the battery at each time step of the optimization period.

In some embodiments, the method includes operating a battery power inverter to control the amount of the electric energy stored in the battery or discharged from the battery during each time step. In some embodiments, operating the battery power inverter causes the battery to store or discharge the amount of the electric energy indicated by the battery energy component at each time step.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
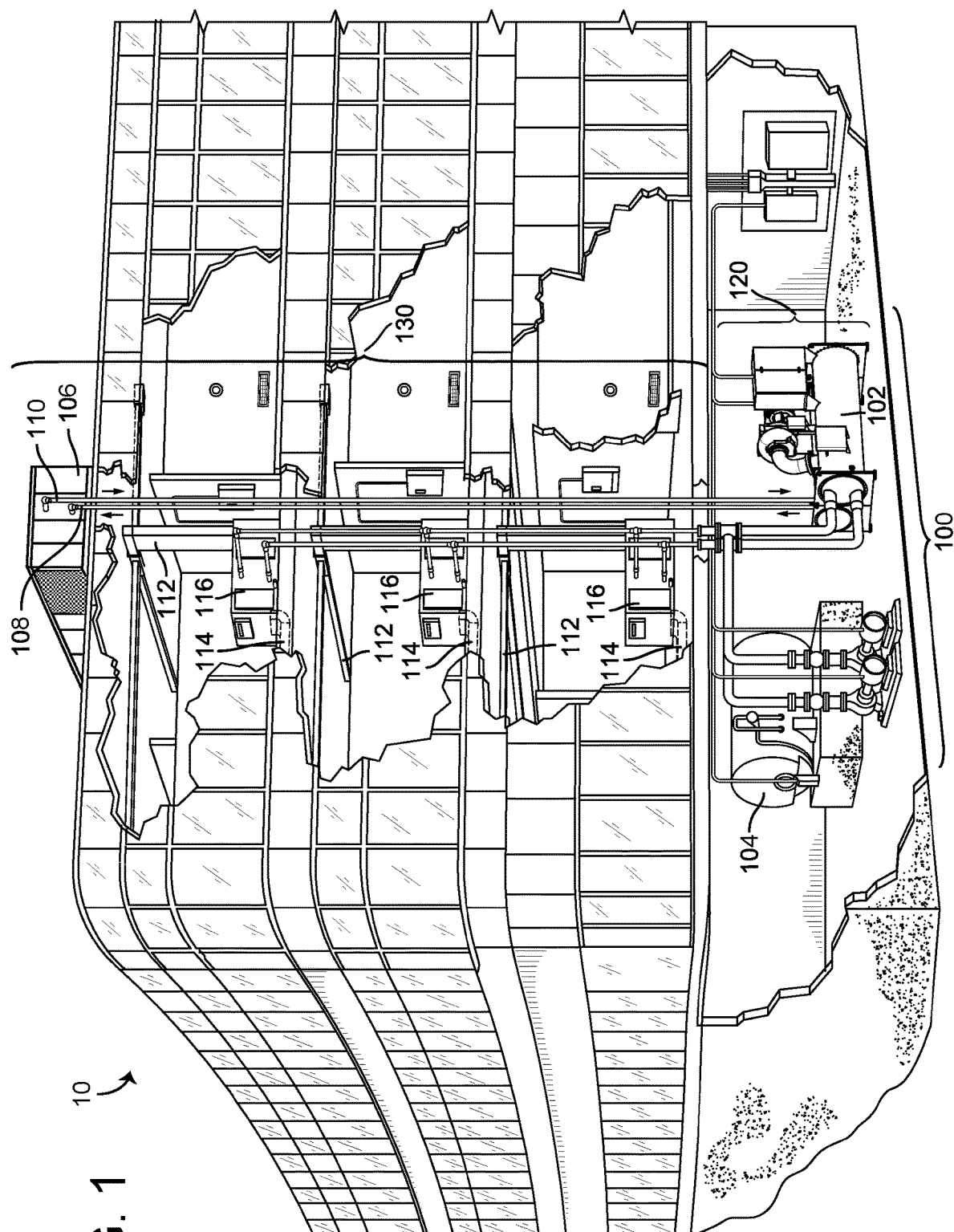
FIG. 1 is a drawing of a building equipped with a HVAC system, according to an exemplary embodiment.

Referring generally to the FIGURES, a building energy system with a predictive controller and components thereof are shown, according to various exemplary embodiments. The building energy system may include a campus that includes one or more buildings and/or a central plant. The buildings may include various types of building equipment (e.g., air handling units, rooftop units, variable refrigerant flow systems, chillers, boilers, etc.) configured to provide heating and/or cooling to a building. The central plant may include various types of central plant equipment (e.g., a chiller subplant, a heater subplant, a cooling tower subplant, etc.) configured to generate a heated fluid or chilled fluid for use in heating or cooling the buildings.

The building energy system may include batteries configured to store electric energy (i.e., electricity) and to discharge the stored electric energy for use in powering the campus. The electric energy can be purchased from the energy grid and/or collected by photovoltaic panels. In some embodiments, the batteries store energy during time periods when energy prices are low and discharge the stored energy when energy prices are high to reduce the cost of energy consumed by the campus. The batteries can be controlled by a predictive controller configured to optimize the cost of operating the campus.

The predictive controller can be configured to generate and provide control signals to the building equipment, the central plant equipment, and to the batteries. In some embodiments, the predictive controller uses a multi-stage optimization technique to generate the control signals. For example, the predictive controller may include an economic controller configured to determine the optimal amount of power to be consumed by the campus at each time step during the optimization period. The optimal amount of power to be consumed may minimize a cost function that accounts for the cost of energy consumed by the campus. The cost of energy may be based on time-varying energy prices from an electric utility (e.g., electricity prices, natural gas prices, etc.). In some embodiments, the economic controller is configured to determine an optimal amount of power to purchase from the energy grid (i.e., a grid power setpoint $P_{sp,grid}$) and an optimal amount of power to store or discharge from the battery (i.e., a battery power setpoint $P_{sp,bat}$) at each time step of the optimization period.

In some embodiments, the predictive controller includes a tracking controller configured to generate temperature setpoints (e.g., a zone temperature setpoint $T_{sp,zone}$, a supply air temperature setpoint $T_{sp,sa}$, etc.) that achieve the optimal amount of power consumption at each time step. In some embodiments, the predictive controller uses equipment models for the equipment of the building and/or central plant to determine an amount of heating or cooling that can be generated by the equipment based on the optimal amount of power consumption. The predictive controller can use a zone temperature model in combination with weather forecasts from a weather service to predict how the temperature of the building zone $T_{zone}$ will change based on the power setpoints and/or the temperature setpoints.

In some embodiments, the predictive controller includes an equipment controller configured to use the temperature setpoints to generate control signals for the central plant equipment and/or the building equipment. The control signals may include on/off commands, speed setpoints for the fan or compressor, position setpoints for actuators and valves, or other operating commands for individual devices of the campus. For example, the equipment controller may receive a measurement of the supply air temperature $T_{sa}$ from a supply air temperature sensor and/or a measurement the zone temperature $T_{zone}$ from a zone temperature sensor. The equipment controller can use a feedback control process (e.g., PID, ESC, MPC, etc.) to operate the building equipment and/or central plant equipment drive the measured temperature to the temperature setpoint. These and other features of the building energy system are described in greater detail below.

Building and HVAC System

Figure 2:
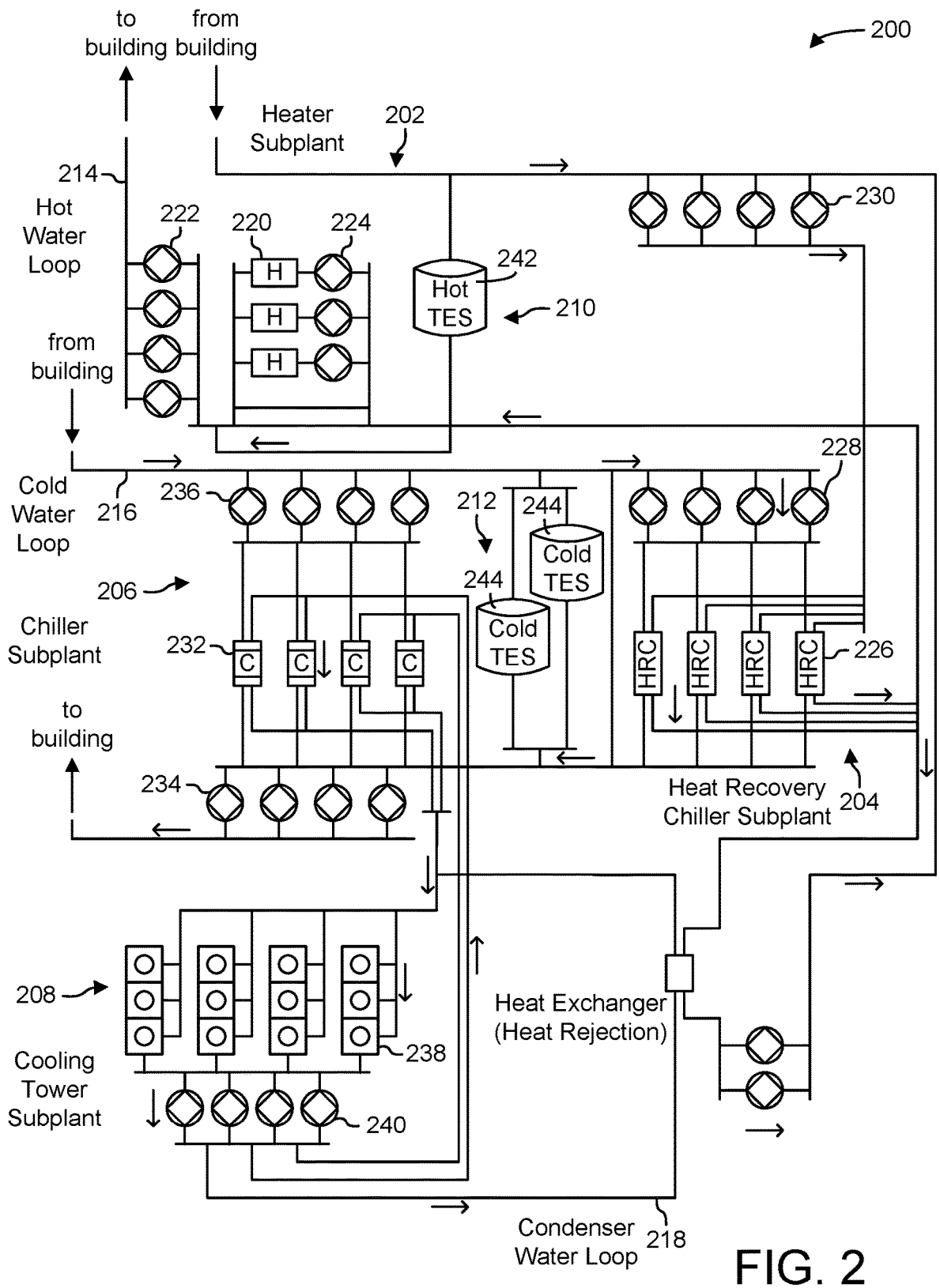
FIG. 2 is a drawing of a waterside system which can be used to provide heating or cooling to the building of FIG. 1, according to an exemplary embodiment.
Figure 3:
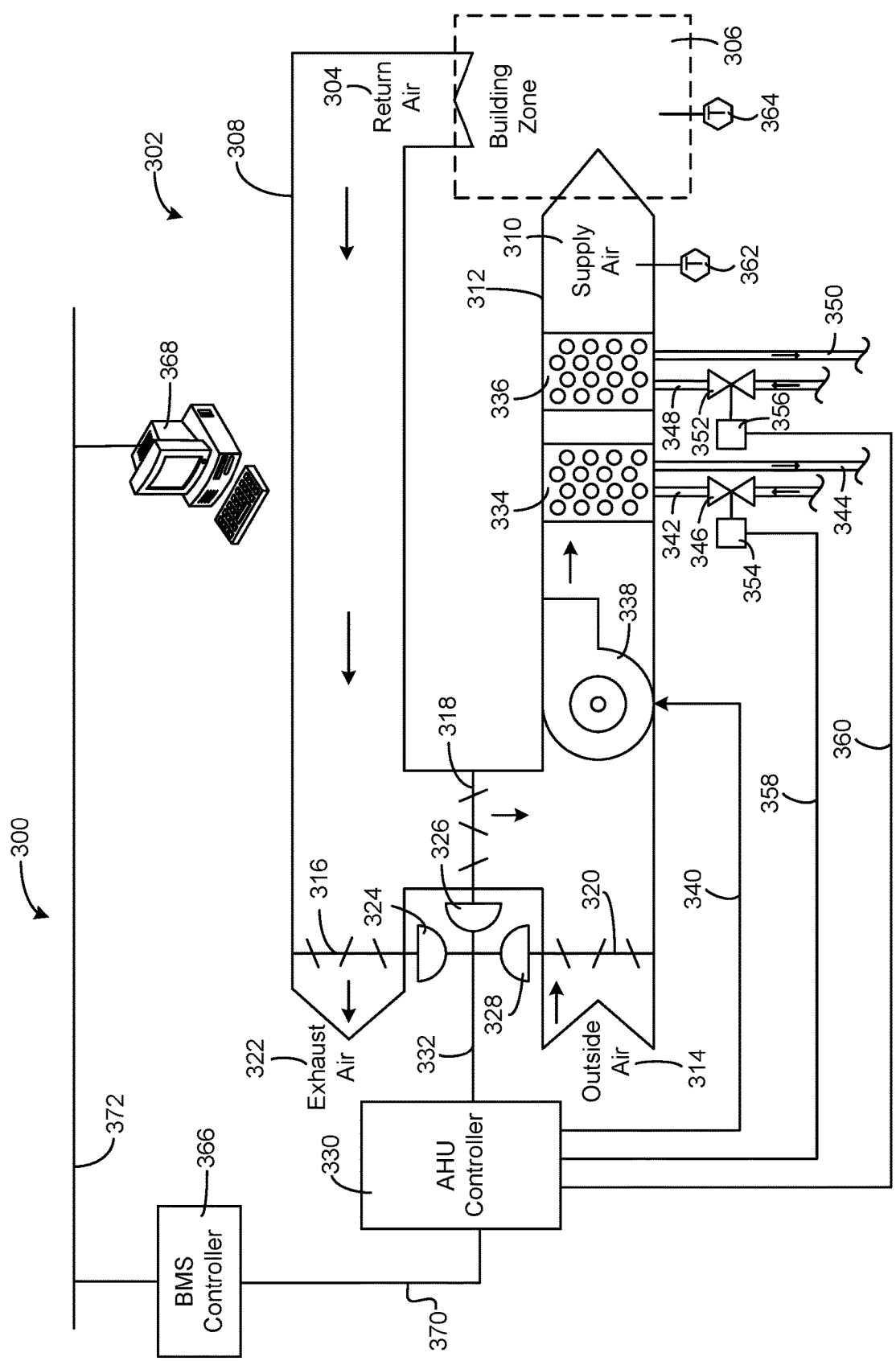
FIG. 3 is a block diagram of an airside system which can be used to provide heating or cooling to the building of FIG. 1, according to an exemplary embodiment.

Referring now to FIGS. 1-3, a building and HVAC system in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Energy System With Predictive Control

Figure 4:
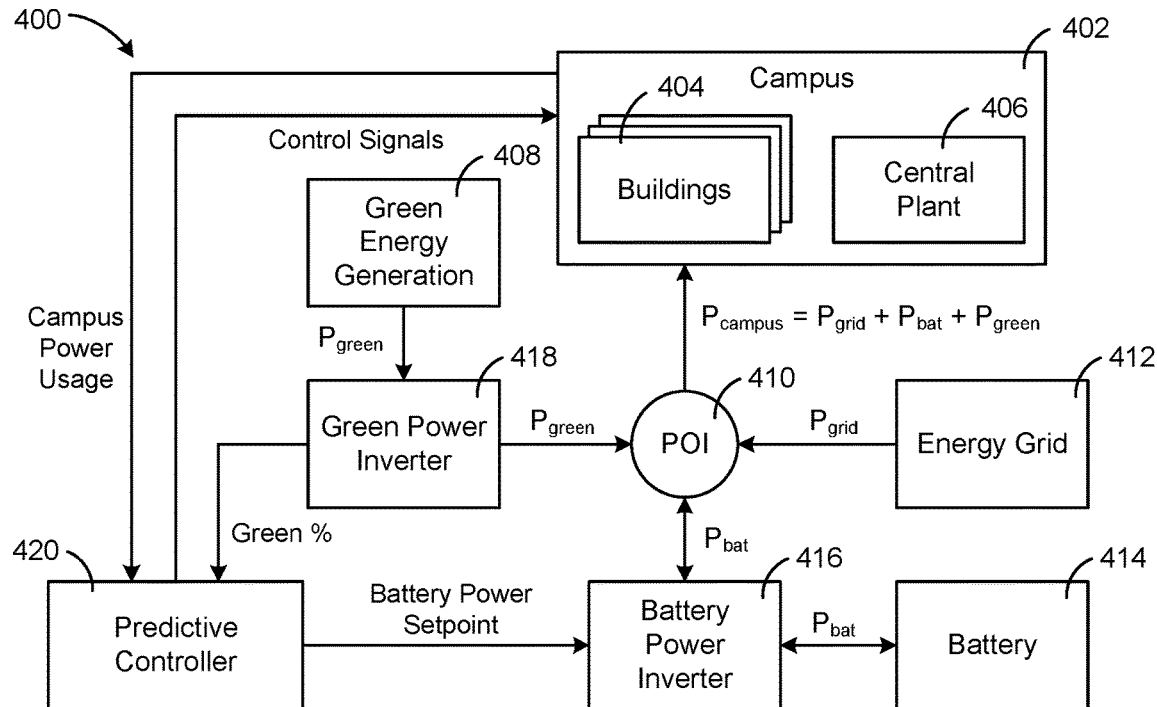
FIG. 4 is a block diagram of a building energy system with green energy generation and a predictive controller, according to an exemplary embodiment.
Figure 5:
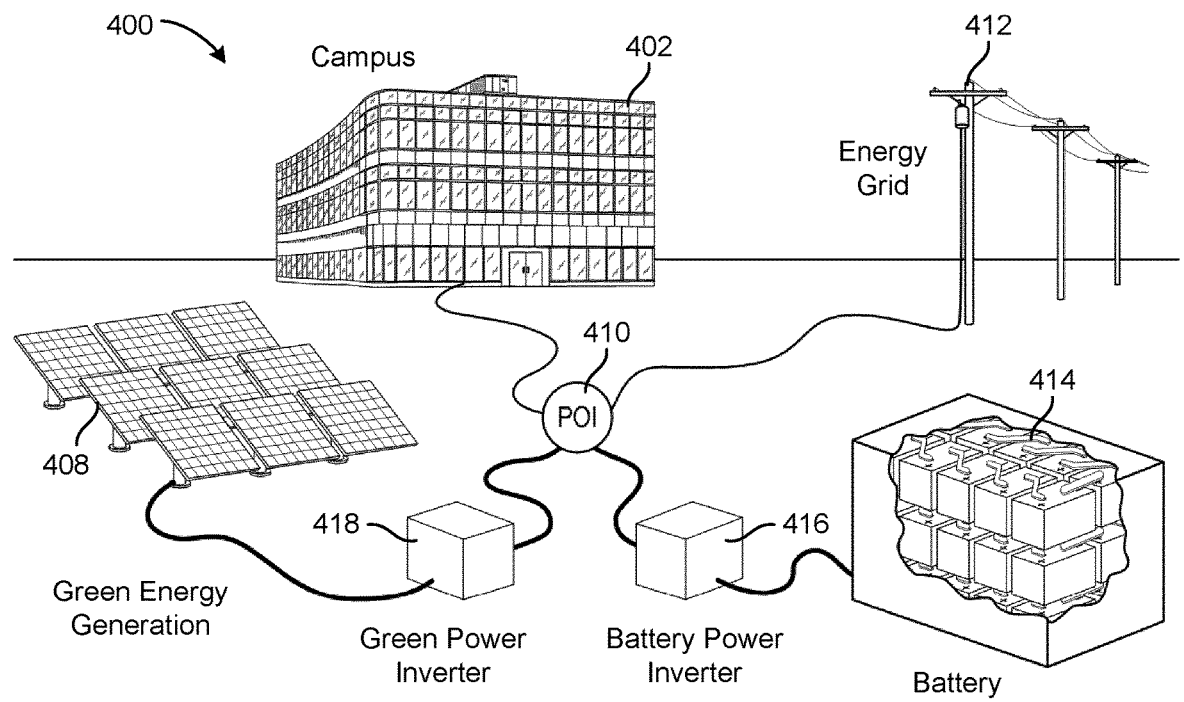
FIG. 5 is a drawing of the building energy system of FIG. 4, according to an exemplary embodiment.

Referring now to FIGS. 4-5, a building energy system 400 with predictive control is shown, according to some embodiments. Several of the components shown in system 400 may be part of HVAC system 100, waterside system 200, and/or airside system 300, as described with reference to FIGS. 1-3. For example, system 400 is shown to include a campus 402 including one or more buildings 404 and a central plant 406. Buildings 404 may include any of a variety of building equipment (e.g., HVAC equipment) configured to serve buildings 404. For example, buildings 404 may include one or more air handling units, rooftop units, chillers, boilers, variable refrigerant flow (VRF) systems, or other HVAC equipment operable to provide heating or cooling to buildings 404. Central plant 406 may include some or all of the components of waterside system 200 (e.g., a heater subplant 202, a heat recovery chiller subplant 204, a chiller subplant 206, a cooling tower subplant 208, a hot thermal energy storage (TES) subplant 210, and a cold thermal energy storage (TES) subplant 212, etc.). The equipment of central plant 406 (e.g., waterside equipment) can be used in combination with the equipment of buildings 404 (e.g., airside equipment) to provide heating or cooling to buildings 404.

Campus 402 can be powered by several different power sources including an energy grid 412, a battery 414, and green energy generation 408. Energy grid 412 may include an electric grid operated by an electric utility. The power provided by energy grid 412 is shown as $P_{grid}$. Green energy generation 408 can include any system or device that generates energy using a renewable energy source (i.e., green energy). For example, green energy generation 408 may include a photovoltaic field, a wind turbine array, a hydroelectric generator, a geothermal generator, or any other type of equipment or system that collects and/or generates green energy for use in system 400. The power provided by green energy generation 408 is shown as $P_{green}$. Battery 414 can be configured to store and discharge electric energy (i.e., electricity provided by energy grid 412 and/or green energy generation 408. The power provided by battery 414 is shown as $P_{bat}$, which can be positive if battery 414 is discharging or negative if battery 414 is charging.

Battery power inverter 416 may be configured to convert electric power between direct current (DC) and alternating current (AC). For example, battery 414 may be configured to store and output DC power, whereas energy grid 412 and campus 402 may be configured to consume and provide AC power. Battery power inverter 416 may be used to convert DC power from battery 414 into a sinusoidal AC output synchronized to the grid frequency of energy grid 412 and/or campus 402. Battery power inverter 416 may also be used to convert AC power from energy grid 412 into DC power that can be stored in battery 414. The power output of battery 414 is shown as $P_{bat}$. $P_{bat}$ may be positive if battery 414 is providing power to power inverter 416 (i.e., battery 414 is discharging) or negative if battery 414 is receiving power from power inverter 416 (i.e., battery 414 is charging).

Green power inverter 418 may also be configured to convert electric power between direct current (DC) and alternating current (AC). For example, green energy generation 408 may be configured to generate DC power, whereas campus 402 may be configured to consume AC power. Green power inverter 418 may be used to convert DC power from green energy generation 408 into a sinusoidal AC output synchronized to the grid frequency of energy grid 412 and/or campus 402.

In some instances, power inverters 416-418 receives a DC power output from battery 414 and/or green energy generation 408 and converts the DC power output to an AC power output that can be provided to campus 402. Power inverters 416-418 may synchronize the frequency of the AC power output with that of energy grid 412 (e.g., 50 Hz or 60 Hz) using a local oscillator and may limit the voltage of the AC power output to no higher than the grid voltage. In some embodiments, power inverters 416-418 are resonant inverters that include or use LC circuits to remove the harmonics from a simple square wave in order to achieve a sine wave matching the frequency of energy grid 412. In various embodiments, power inverters 416-418 may operate using high-frequency transformers, low-frequency transformers, or without transformers. Low-frequency transformers may convert the DC output from battery 414 or green energy generation 408 directly to the AC output provided to campus 402. High-frequency transformers may employ a multi-step process that involves converting the DC output to high-frequency AC, then back to DC, and then finally to the AC output provided to campus 402.

Point of interconnection (POI) 410 is the point at which campus 402, energy grid 412, and power inverters 416-418 are electrically connected. The power supplied to POI 410 from battery power inverter 416 is shown as $P_{bat}$. $P_{bat}$ may be positive if battery power inverter 416 is providing power to POI 410 (i.e., battery 414 is discharging) or negative if battery power inverter 416 is receiving power from POI 410 (i.e., battery 414 is charging). The power supplied to POI 410 from energy grid 412 is shown as $P_{grid}$, and the power supplied to POI 410 from green power inverter 418 is shown as $P_{green}$. $P_{bat}$, $P_{green}$, and $P_{grid}$ combine at POI 410 to form $P_{campus}$ (i.e., $P_{campus}=P_{grid}+P_{bat}+P_{green}$). $P_{campus}$ may be defined as the power provided to campus 402 from POI 410. In some instances, $P_{campus}$ is greater than $P_{grid}$. For example, when battery 414 is discharging, $P_{bat}$ may be positive which adds to the grid power $P_{grid}$ when $P_{bat}$ and $P_{grid}$ combine at POI 410. Similarly, when green energy generation 408 is providing power to POI 410, $P_{green}$ may be positive which adds to the grid power $P_{grid}$ when $P_{green}$ and $P_{grid}$ combine at POI 410. In other instances, $P_{campus}$ may be less than $P_{grid}$. For example, when battery 414 is charging, $P_{bat}$ may be negative which subtracts from the grid power $P_{grid}$ when $P_{bat}$ and $P_{grid}$ combine at POI 410.

Predictive controller 420 can be configured to control the equipment of campus 402 and battery power inverter 416 to optimize the economic cost of heating or cooling buildings 404. In some embodiments, predictive controller 420 generates and provides a battery power setpoint $P_{sp,bat}$ to battery power inverter 416. The battery power setpoint $P_{sp,bat}$ may include a positive or negative power value (e.g., kW) which causes battery power inverter 416 to charge battery 414 (when $P_{sp,bat}$ is negative) using power available at POI 410 or discharge battery 414 (when $P_{sp,bat}$ is positive) to provide power to POI 410 in order to achieve the battery power setpoint $P_{sp,bat}$.

In some embodiments, predictive controller 420 generates and provides control signals to campus 402. Predictive controller 420 may use a multi-stage optimization technique to generate the control signals. For example, predictive controller 420 may include an economic controller configured to determine the optimal amount of power to be consumed by campus 402 at each time step during the optimization period. The optimal amount of power to be consumed may minimize a cost function that accounts for the cost of energy consumed by the equipment of buildings 404 and/or central plant 406. The cost of energy may be based on time-varying energy prices defining the cost of purchasing electricity from energy grid 412 at various times. In some embodiments, predictive controller 420 determines an optimal amount of power to purchase from energy grid 412 (i.e., a grid power setpoint $P_{sp,grid}$) and an optimal amount of power to store or discharge from battery 414 (i.e., a battery power setpoint $P_{sp,bat}$) at each of the plurality of time steps. In some embodiments, predictive controller 420 determines an optimal power setpoint for each subsystem or device of campus 402 (e.g., each subplant of central plant 406, each device of building equipment, etc.). Predictive controller 420 may monitor the actual power usage of campus 402 and may utilize the actual power usage as a feedback signal when generating the optimal power setpoints.

Predictive controller 420 may include a tracking controller configured to generate temperature setpoints (e.g., a zone temperature setpoint $T_{sp,zone}$, a supply air temperature setpoint $T_{sp,sa}$, etc.) that achieve the optimal amount of power consumption at each time step. In some embodiments, predictive controller 420 uses equipment models for the equipment of buildings 404 and campus 406 to determine an amount of heating or cooling that can be generated by such equipment based on the optimal amount of power consumption. Predictive controller 420 can use a zone temperature model in combination with weather forecasts from a weather service to predict how the temperature of the building zone $T_{zone}$ will change based on the power setpoints and/or the temperature setpoints.

In some embodiments, predictive controller 420 uses the temperature setpoints to generate the control signals for the equipment of buildings 404 and campus 406. The control signals may include on/off commands, speed setpoints for fans, position setpoints for actuators and valves, or other operating commands for individual devices of campus 402. In other embodiments, the control signals may include the temperature setpoints (e.g., a zone temperature setpoint $T_{sp,zone}$, a supply air temperature setpoint $T_{sp,sa}$, etc.) generated by predictive controller 420. The temperature setpoints can be provided to campus 402 or local controllers for campus 402 which operate to achieve the temperature setpoints. For example, a local controller for an AHU fan within buildings 404 may receive a measurement of the supply air temperature $T_{sa}$ from a supply air temperature sensor and/or a measurement the zone temperature $T_{zone}$ from a zone temperature sensor. The local controller can use a feedback control process (e.g., PID, ESC, MPC, etc.) to adjust the speed of the AHU fan to drive the measured temperature(s) to the temperature setpoint(s). Similar feedback control processes can be used to control the positions of actuators and valves. The multi-stage optimization performed by predictive controller 420 is described in greater detail with reference to FIG. 6.

Predictive Controller

Figure 6:
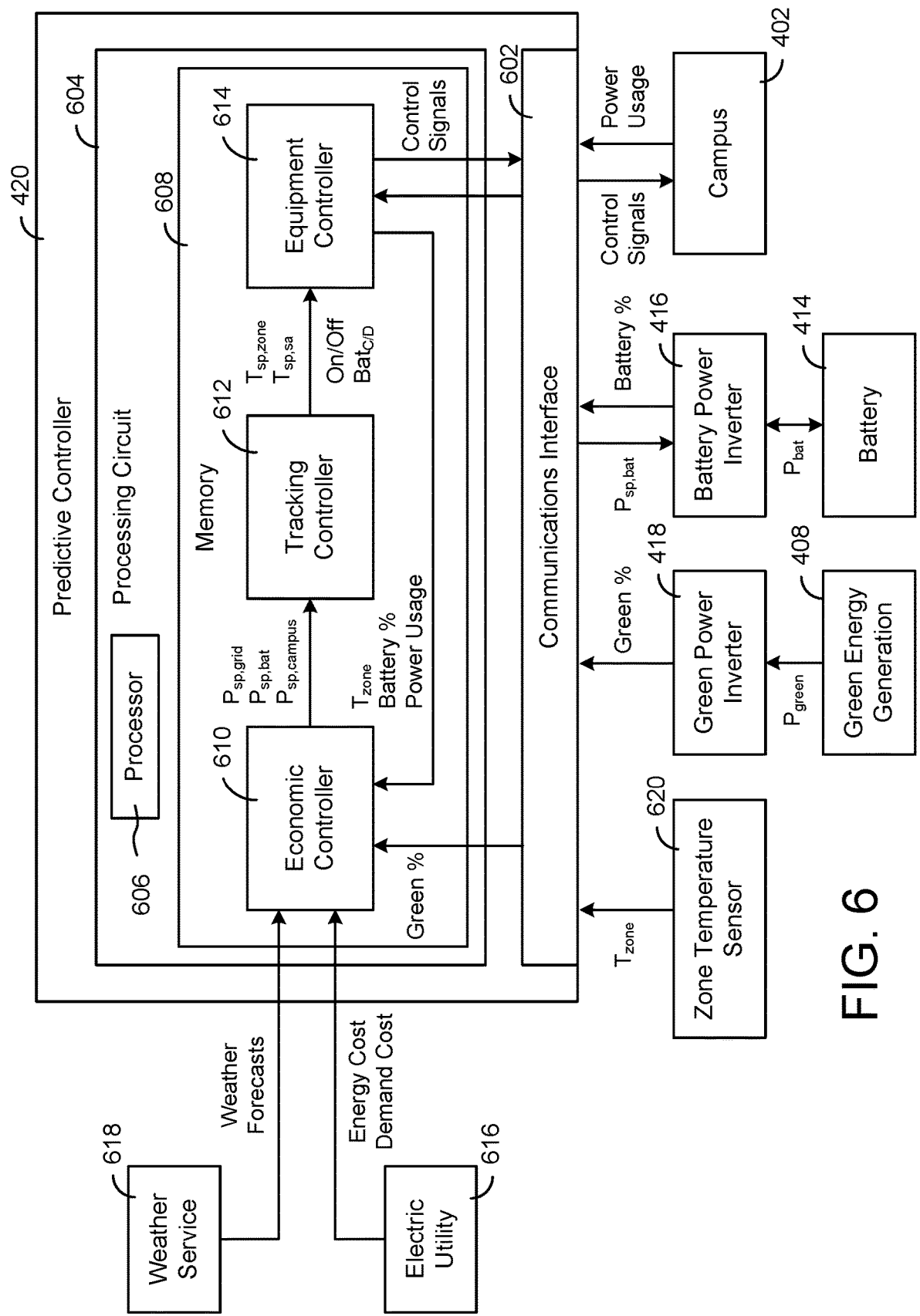
FIG. 6 is a block diagram illustrating the predictive controller of FIG. 4 in greater detail, according to an exemplary embodiment.

Referring now to FIG. 6, a block diagram illustrating predictive controller 420 in greater detail is shown, according to an exemplary embodiment. Predictive controller 420 is shown to include a communications interface 602 and a processing circuit 604. Communications interface 602 may facilitate communications between predictive controller 420 and external systems or devices. For example, communications interface 602 may receive measurements of the zone temperature $T_{zone}$ from a zone temperature sensor 620 and measurements of the power usage of campus 402. In some embodiments, communications interface 602 receives measurements of the state-of-charge (SOC) of battery 414, which can be provided as a percentage of the maximum battery capacity (i.e., battery %). Similarly, communications interface 602 may receive an indication of the amount of power being generated by green energy generation 408, which can be provided as a percentage of the maximum green power generation (i.e., green %). Communications interface 602 can receive weather forecasts from a weather service 618 and predicted energy costs and demand costs from an electric utility 616. In some embodiments, predictive controller 420 uses communications interface 602 to provide control signals campus 402 and power inverter 416.

Communications interface 602 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 602 can include an Ethernet card and port for sending and receiving data via an Ethernet-based communications link or network. In another example, communications interface 602 can include a Wi-Fi transceiver for communicating via a wireless communications network or cellular or mobile phone communications transceivers.

Processing circuit 604 is shown to include a processor 606 and memory 608. Processor 606 may be a general purpose or specific purpose processor, an application specific integrated circuit (ASIC), one or more field programmable gate arrays (FPGAs), a group of processing components, or other suitable processing components. Processor 606 is configured to execute computer code or instructions stored in memory 608 or received from other computer readable media (e.g., CDROM, network storage, a remote server, etc.).

Memory 608 may include one or more devices (e.g., memory units, memory devices, storage devices, etc.) for storing data and/or computer code for completing and/or facilitating the various processes described in the present disclosure. Memory 608 may include random access memory (RAM), read-only memory (ROM), hard drive storage, temporary storage, non-volatile memory, flash memory, optical memory, or any other suitable memory for storing software objects and/or computer instructions. Memory 608 may include database components, object code components, script components, or any other type of information structure for supporting the various activities and information structures described in the present disclosure. Memory 608 may be communicably connected to processor 606 via processing circuit 604 and may include computer code for executing (e.g., by processor 606) one or more processes described herein. When processor 606 executes instructions stored in memory 608 for completing the various activities described herein, processor 606 generally configures predictive controller 420 (and more particularly processing circuit 604) to complete such activities.

Still referring to FIG. 6, predictive controller 420 is shown to include an economic controller 610, a tracking controller 612, and an equipment controller 614. Controllers 610-614 can be configured to perform a multi-state optimization process to generate control signals for power battery power inverter 416 and campus 402. In brief overview, economic controller 610 can optimize a predictive cost function to determine an optimal amount of power to purchase from energy grid 412 (i.e., a grid power setpoint $P_{sp,grid}$), an optimal amount of power to store or discharge from battery 414 (i.e., a battery power setpoint $P_{sp,bat}$), and/or an optimal amount of power to be consumed by campus 402 (i.e., a campus power setpoint $P_{sp,campus}$) at each time step of an optimization period. Tracking controller 612 can use the optimal power setpoints $P_{sp,grid}$, $P_{sp,bat}$, and/or $P_{sp,campus}$ to determine optimal temperature setpoints (e.g., a zone temperature setpoint $T_{sp,zone}$, a supply air temperature setpoint $T_{sp,sa}$, etc.) and an optimal battery charge or discharge rate (i.e., $Bat_{C/D}$). Equipment controller 614 can use the optimal temperature setpoints $T_{sp,zone}$ or $T_{sp,sa}$ to generate control signals for campus 402 that drive the actual (e.g., measured) temperatures $T_{zone}$ and/or $T_{sa}$ to the setpoints (e.g., using a feedback control technique). Each of controllers 610-614 is described in detail below.

Economic Controller

Economic controller 610 can be configured to optimize a predictive cost function to determine an optimal amount of power to purchase from energy grid 412 (i.e., a grid power setpoint $P_{sp,grid}$), an optimal amount of power to store or discharge from battery 414 (i.e., a battery power setpoint $P_{sp,bat}$), and/or an optimal amount of power to be consumed by campus 402 (i.e., a campus power setpoint $P_{sp,campus}$) at each time step of an optimization period. An example of a predictive cost function which can be optimized by economic controller 610 is shown in the following equation:

$$\min(J) = \sum_{k=1}^{h} C_{ec}(k)P_{CPO}(k)\Delta t + \sum_{k=1}^{h} C_{ec}(k)P_{RTU}(k)\Delta t +$$

-continued $$\sum_{k=1}^{h} C_{ec}(k)P_{VRF}(k)\Delta t + \sum_{k=1}^{h} C_{ec}(k)P_{AHU}(k)\Delta t + C_{DC}\max_k(P_{grid}(k)) -$$

$$\sum_{k=1}^{h} C_{ec}(k)P_{bat}(k)\Delta t$$

where $C_{ec}(k)$ is the cost per unit of electricity (e.g., $/kWh) purchased from energy grid 412 during time step k, $P_{CPO}(k)$ is the total power consumption (e.g., kW) of central plant 406 time step k, $P_{RTU}(k)$ is the total power consumption of the RTUs of buildings 404 during time step k, $P_{VRF}(k)$ is the total power consumption of the VRF system used to serve buildings 404 during time step k, $P_{AHU}(k)$ is the total power consumption of the AHUs of buildings 404 during time step k, $C_{DC}$ is the demand charge rate (e.g., $/kW), the max( ) term selects the maximum value of $P_{grid}(k)$ during any time step k of the optimization period, $P_{bat}(k)$ is the amount of power discharged from battery 414 during time step k, and $\Delta t$ is the duration of each time step k. Economic controller 610 can optimize the predictive cost function J over the duration of the optimization period (e.g., from time step k=1 to time step k=h) to predict the total cost of heating or cooling campus 402 over the duration of the optimization period.

The first term of the predictive cost function J represents the cost of electricity consumed by central plant 406 over the duration of the optimization period. The values of the parameter $C_{ec}(k)$ at each time step k can be defined by the energy cost information provided by electric utility 616. In some embodiments, the cost of electricity varies as a function of time, which results in different values of $C_{ec}(k)$ at different time steps k. The variable $P_{CPO}(k)$ is a decision variable which can be optimized by economic controller 610. In some embodiments, $P_{CPO}(k)$ is a component of $P_{campus}$ (e.g., $P_{campus}=P_{CPO}+P_{RTU}+P_{VRF}+P_{AHU}$). In some embodiments, $P_{CPO}(k)$ is a summation of the power consumptions of each subplant of central plant 406 (e.g., $P_{CPO}=P_{ChillerSubplant}+P_{HRCSubplant}+P_{HeaterSubplant}$). If campus 402 does not include a central plant 406, the first term of the predictive cost function J may be omitted.

In some embodiments, economic controller 410 uses one or more subplant curves for central plant 406 to relate the value of $P_{CPO}$ to the production of central plant 406 (e.g., hot water production, chilled water production, etc.). For example, if a chiller subplant 206 is used to generate a chilled fluid, a subplant curve for chiller subplant 206 can be used to model the performance of chiller subplant 206. In some embodiments, the subplant curve defines the relationship between input resources and output resources of chiller subplant 206. For example, the subplant curve for chiller subplant 206 may define the electricity consumption (e.g., kW) of chiller subplant 206 as a function of the amount of cooling provided by chiller subplant 206 (e.g., tons). Economic controller 610 can use the subplant curve for chiller subplant 206 to determine an amount of electricity consumption (kW) that corresponds to a given amount of cooling (tons). Similar subplant curves can be used to model the performance of other subplants of central plant 406. Several examples of subplant curves which can be used by economic controller 610 are described in greater detail in U.S. patent application Ser. No. 14/634,609 filed Feb. 27, 2015, the entire disclosure of which is incorporated by reference herein.

The second, third, and fourth terms of the predictive cost function J represent the cost of electricity consumed by the equipment of buildings 404. For example, the second term of the predictive cost function J represents the cost of electricity consumed by one or more AHUs of buildings 404. The third term of the predictive cost function J represents the cost of electricity consumed by a VRF system of buildings 404. The fourth term of the predictive cost function J represents the cost of electricity consumed by one or more RTUs of buildings 404. In some embodiments, economic controller 610 uses equipment performance curves to model the power consumptions $P_{RTU}$, $P_{VRF}$, and $P_{AHU}$ as a function of the amount of heating or cooling provided by the respective equipment of buildings 404. The equipment performance curves may be similar to the subplant curves in that they define a relationship between the heating or cooling load on a system or device and the power consumption of that system or device. The subplant curves and equipment performance curves can be used by economic controller 610 to impose constraints on the predictive cost function J. In some embodiments, one or more of the second, third, and fourth terms of the predictive cost function J may be omitted if buildings 404 do not include RTUs, AHUs, or VRF systems.

The fifth term of the predictive cost function J represents the demand charge. Demand charge is an additional charge imposed by some utility providers based on the maximum power consumption during an applicable demand charge period. For example, the demand charge rate $C_{DC}$ may be specified in terms of dollars per unit of power (e.g., $/kW) and may be multiplied by the peak power usage (e.g., kW) during a demand charge period to calculate the demand charge. In the predictive cost function J, the demand charge rate $C_{DC}$ may be defined by the demand cost information received from electric utility 616. The variable $P_{grid}(k)$ is a decision variable which can be optimized by economic controller 610 in order to reduce the peak power usage $\max(P_{grid}(k))$ that occurs during the demand charge period. Load shifting may allow economic controller 610 to smooth momentary spikes in the electric demand of campus 402 by storing energy in battery 414 when the power consumption of campus 402 is low. The stored energy can be discharged from battery 414 when the power consumption of campus 402 is high in order to reduce the peak power draw $P_{grid}$ from energy grid 412, thereby decreasing the demand charge incurred.

The final term of the predictive cost function J represents the cost savings resulting from the use of battery 414. Unlike the previous terms in the cost function J, the final term subtracts from the total cost. The values of the parameter $C_{ec}(k)$ at each time step k can be defined by the energy cost information provided by electric utility 616. In some embodiments, the cost of electricity varies as a function of time, which results in different values of $C_{ec}(k)$ at different time steps k. The variable $P_{bat}(k)$ is a decision variable which can be optimized by economic controller 610. A positive value of $P_{bat}(k)$ indicates that battery 414 is discharging, whereas a negative value of $P_{bat}(k)$ indicates that battery 414 is charging. The power discharged from battery 414 $P_{bat}(k)$ can be used to satisfy some or all of the total power consumption $P_{total}(k)$ of campus 402, which reduces the amount of power $P_{grid}(k)$ purchased from energy grid 412 (i.e., $P_{grid}(k)=P_{total}(k)-P_{bat}(k)-P_{green}(k)$). However, charging battery 414 results in a negative value of $P_{bat}(k)$ which adds to the total amount of power $P_{grid}(k)$ purchased from energy grid 412.

In some embodiments, the power $P_{green}$ provided by green energy generation 408 is not included in the predictive cost function J because generating green power does not incur a cost. However, the power $P_{green}$ generated by green energy generation 408 can be used to satisfy some or all of the total power consumption $P_{campus}(k)$ of campus 402, which reduces the amount of power $P_{grid}(k)$ purchased from energy grid 412 and/or the amount of power $P_{bat}(k)$ discharged from battery 414 (i.e., $P_{grid}(k)=P_{campus}(k)-P_{bat}(k)-P_{green}(k)$). The amount of green power $P_{green}$ generated during any time step k can be predicted by economic controller 610. Several techniques for predicting the amount of green power generated by green energy generation 408 are described in U.S. patent application Ser. No. 15/247,869, U.S. patent application Ser. No. 15/247,844, and U.S. patent application Ser. No. 15/247,788. Each of these patent applications has a filing date of Aug. 25, 2016, and the entire disclosure of each of these patent applications is incorporated by reference herein.

Economic controller 610 can optimize the predictive cost function J over the duration of the optimization period to determine optimal values of the decision variables at each time step during the optimization period. In some embodiments, the optimization period has a duration of approximately one day and each time step is approximately fifteen minutes. However, the durations of the optimization period and the time steps can vary in other embodiments and can be adjusted by a user. Advantageously, economic controller 610 can use battery 414 to perform load shifting by drawing electricity from energy grid 412 when energy prices are low and/or when the power consumed by campus 402 is low. The electricity can be stored in battery 414 and discharged later when energy prices are high and/or the power consumption of campus 402 is high. This enables economic controller 610 to reduce the cost of electricity consumed by campus 402 and can smooth momentary spikes in the electric demand of campus 402, thereby reducing the demand charge incurred.

Economic controller 610 can be configured to impose constraints on the optimization of the predictive cost function J. In some embodiments, the constraints include constraints on the temperature $T_{zone}$ of buildings 404. Economic controller 610 can be configured to maintain the actual or predicted temperature $T_{zone}$ between an minimum temperature bound $T_{min}$ and a maximum temperature bound $T_{max}$ (i.e., $T_{min} \leq T_{zone} \leq T_{max}$) at all times. The parameters $T_{min}$ and $T_{max}$ may be time-varying to define different temperature ranges at different times (e.g., an occupied temperature range, an unoccupied temperature range, a daytime temperature range, a nighttime temperature range, etc.).

In order to ensure that the zone temperature constraint is satisfied, economic controller 610 can model the zone temperature $T_{zone}$ of buildings 404 as a function of the decision variables optimized by economic controller 610. In some embodiments, economic controller 610 models $T_{zone}$ using a heat transfer model. For example, the dynamics of heating or cooling buildings 404 can be described by the energy balance:

$$C \frac{dT_{zone}}{dt} = -H(T_{zone} - T_a) + \dot{Q}_{HVAC} + \dot{Q}_{other}$$

where C is the thermal capacitance of the building zone, H is the ambient heat transfer coefficient for the building zone, $T_{zone}$ is the temperature of the building zone, $T_a$ is the ambient temperature outside the building zone (e.g., the outside air temperature), $\dot{Q}_{HVAC}$ is the amount of heating applied to the building zone by the HVAC equipment of buildings 404, and $\dot{Q}_{other}$ is the external load, radiation, or other disturbance experienced by the building zone. In the previous equation, $\dot{Q}_{HVAC}$ represents heat transfer into the building zone (i.e., the heating load) and therefore has a positive sign. However, if cooling is applied to the building zone rather than heating, the sign on $\dot{Q}_{HVAC}$ can be switched to a negative sign such that $\dot{Q}_{HVAC}$ represents the amount of cooling applied to the building zone (i.e., the cooling load).

In some embodiments, the amount of heating or cooling $\dot{Q}_{HVAC}$ provided to buildings 404 can be defined as the heating or cooling load on the HVAC equipment of buildings 404 (e.g., RTUs, AHUs, VRF systems, etc.) and/or central plant 406. Several techniques for developing zone temperature models and relating the zone temperature $T_{zone}$ to the decision variables in the predictive cost function J are described in greater detail in U.S. Pat. No. 9,436,179 granted Sep. 6, 2016, U.S. patent application Ser. No. 14/694,633 filed Apr. 23, 2015, and U.S. patent application Ser. No. 15/199,910 filed Jun. 30, 2016. The entire disclosure of each of these patents and patent applications is incorporated by reference herein.

The previous energy balance combines all mass and air properties of the building zone into a single zone temperature. Other heat transfer models which can be used by economic controller 610 include the following air and mass zone models:

$$C_z \frac{dT_{zone}}{dt} = H_{az}(T_a - T_{zone}) + H_{mz}(T_m - T_{zone}) + \dot{Q}_{HVAC} + \dot{Q}_{other}$$

$$C_m \frac{dT_m}{dt} = H_{mz}(T_{zone} - T_m)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by economic controller 610 include the following air, shallow mass, and deep mass zone models:

$$C_z \frac{dT_{zone}}{dt} = H_{az}(T_a - T_{zone}) + H_{sz}(T_s - T_{zone}) + \dot{Q}_{HVAC} + \dot{Q}_{other}$$

$$C_s \frac{dT_s}{dt} = H_{sz}(T_{zone} - T_s) + H_{ds}(T_d - T_s)$$

$$C_d \frac{dT_d}{dt} = H_{ds}(T_s - T_d)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, economic controller 610 uses the weather forecasts from weather service 618 to determine appropriate values for the ambient air temperature $T_a$ and/or the external disturbance $\dot{Q}_{other}$ at each time step of the optimization period. Values of C and H can be specified as parameters of the building zone, received from tracking controller 612, received from a user, retrieved from memory 608, or otherwise provided as an input to economic controller 610. Accordingly, the temperature of the building zone $T_{zone}$ can be defined as a function of the amount of heating or cooling $\dot{Q}_{HVAC}$ applied to the building zone using any of these heat transfer models. The manipulated variable $\dot{Q}_{HVAC}$ can be adjusted by economic controller 610 by adjusting the variables $P_{CPO}$, $P_{RTU}$, $P_{VRF}$, and/or $P_{AHU}$ in the predictive cost function J.

In some embodiments, economic controller 610 uses a model that defines the amount of heating or cooling $\dot{Q}_{HVAC}$ applied to the building zone as a function of the power setpoints $P_{sp,grid}$ and $P_{sp,bat}$ provided by economic controller 610. For example, economic controller 610 can add the power setpoints $P_{sp,grid}$ and $P_{sp,bat}$ to the green power generation $P_{green}$ to determine the total amount of power $P_{campus}$ that will be consumed by campus 402. In some embodiments, $P_{campus}$ is equivalent to the combined power consumption of buildings 404 and central plant 406 (e.g., $P_{campus} = P_{CPO} + P_{AHU} + P_{VRF} + P_{RTU}$). Economic controller 610 can use $P_{campus}$ in combination with the subplant curves for central plant 406 and the equipment performance curves for the HVAC equipment of buildings 404 the total amount of heating or cooling $\dot{Q}_{HVAC}$ applied to the building zone.

In some embodiments, economic controller 610 uses one or more models that define the amount of heating or cooling applied to the building zone (i.e., $\overline{Q}_{HVAC}$) as a function of the zone temperature $T_{zone}$ and the zone temperature setpoint $T_{sp,zone}$ as shown in the following equation:

$$\dot{Q}_{HVAC} = f(T_{zone}, T_{sp,zone})$$

The models used by economic controller 610 can be imposed as optimization constraints to ensure that the amount of heating or cooling $\dot{Q}_{HVAC}$ provided is not reduced to a value that would cause the zone temperature $T_{zone}$ to deviate from an acceptable or comfortable temperature range.

In some embodiments, economic controller 610 relates the amount of heating or cooling $\dot{Q}_{HVAC}$ to the zone temperature $T_{zone}$ and the zone temperature setpoint $T_{sp,zone}$ using multiple models. For example, economic controller 610 can use a model of equipment controller 614 to determine the control action performed by equipment controller 614 as a function of the zone temperature $T_{zone}$ and the zone temperature setpoint $T_{sp,zone}$. An example of such a zone regulatory controller model is shown in the following equation:

$$v_{air} = f_1(T_{zone}, T_{sp,zone})$$

where $v_{air}$ is the rate of airflow to the building zone (i.e., the control action). In some embodiments, $v_{air}$ depends on the speed of an AHU fan or RTU fan and may be a function of $P_{AHU}$ and/or $P_{RTU}$. Economic controller 610 can use an equipment model or manufacturer specifications for the AHU or RTU to define $v_{air}$ as a function of $P_{AHU}$ or $P_{RTU}$. The function $f_1$ can be identified from data. For example, economic controller 610 can collect measurements of $v_{air}$ and $T_{zone}$ and identify the corresponding value of $T_{sp,zone}$. Economic controller 610 can perform a system identification process using the collected values of $v_{air}$, $T_{zone}$, and $T_{sp,zone}$ as training data to determine the function $f_1$ that defines the relationship between such variables.

Economic controller 610 can use an energy balance model relating the control action $v_{air}$ to the amount of heating or cooling $\dot{Q}_{HVAC}$ provided to buildings 404 as shown in the following equation:

$$\dot{Q}_{HVAC} = f_2(v_{air})$$

where the function $f_2$ can be identified from training data. Economic controller 610 can perform a system identification process using collected values of $v_{air}$ and $\dot{Q}_{HVAC}$ to determine the function $f_2$ that defines the relationship between such variables.

In some embodiments, a linear relationship exists between $\dot{Q}_{HVAC}$ and $v_{air}$. Assuming an ideal proportional-integral (PI) controller and a linear relationship between $\dot{Q}_{HVAC}$ and $v_{air}$, a simplified linear controller model can be used to define the amount of heating or cooling $\dot{Q}_{HVAC}$ provided to buildings 404 as a function of the zone temperature $T_{zone}$ and the zone temperature setpoint $T_{sp,zone}$. An example of such a model is shown in the following equations:

$$\dot{Q}_{HVAC} = \dot{Q}_{ss} + K_c\left[\varepsilon + \frac{1}{\tau_I}\int_0^t \varepsilon(t')dt'\right]$$

$$\varepsilon = T_{sp,zone} - T_{zone}$$

where $\dot{Q}_{ss}$ is the steady-state rate of heating or cooling rate, $K_c$ is the scaled zone PI controller proportional gain, $\tau_I$ is the zone PI controller integral time, and $\varepsilon$ is the setpoint error (i.e., the difference between the zone temperature setpoint $T_{sp,zone}$ and the zone temperature $T_{zone}$). Saturation can be represented by constraints on $\dot{Q}_{HVAC}$. If a linear model is not sufficiently accurate to model equipment controller 614, a nonlinear heating/cooling duty model can be used instead.

In addition to constraints on the zone temperature $T_{zone}$, economic controller 610 can impose constraints on the state-of-charge (SOC) and charge/discharge rates of battery 414. In some embodiments, economic controller 610 generates and imposes the following power constraints on the predictive cost function J:

$$P_{bat} \le P_{rated}$$

$$-P_{bat} \le P_{rated}$$

where $P_{bat}$ is the amount of power discharged from battery 414 and $P_{rated}$ is the rated battery power of battery 414 (e.g., the maximum rate at which battery 414 can be charged or discharged). These power constraints ensure that battery 414 is not charged or discharged at a rate that exceeds the maximum possible battery charge/discharge rate $P_{rated}$.

In some embodiments, economic controller 610 generates and imposes one or more capacity constraints on the predictive cost function J. The capacity constraints may be used to relate the battery power $P_{bat}$ charged or discharged during each time step to the capacity and SOC of battery 414. The capacity constraints may ensure that the capacity of battery 414 is maintained within acceptable lower and upper bounds at each time step of the optimization period. In some embodiments, economic controller 610 generates the following capacity constraints:

$$C_a(k) - P_{bat}(k)\Delta t \le C_{rated}$$

$$C_a(k) - P_{bat}(k)\Delta t \ge 0$$

where $C_a(k)$ is the available battery capacity (e.g., kWh) at the beginning of time step k, $P_{bat}(k)$ is the rate at which battery 414 is discharged during time step k (e.g., kW), $\Delta t$ is the duration of each time step, and $C_{rated}$ is the maximum rated capacity of battery 414 (e.g., kWh). The term $P_{bat}(k)\Delta t$ represents the change in battery capacity during time step k. These capacity constraints ensure that the capacity of battery 414 is maintained between zero and the maximum rated capacity $C_{rated}$.

In some embodiments, economic controller 610 generates and imposes one or more power constraints. For example, economic controller 610 can be configured to generate a constraint which limits the power $P_{campus}$ provided to campus 402 between zero and the maximum power throughput $P_{campus,max}$ of POI 410, as shown in the following equation:

$$0 \le P_{campus}(k) \le P_{campus,max}$$

$$P_{campus}(k) = P_{sp,grid}(k) + P_{sp,bat}(k) + P_{green}(k)$$

where the total power $P_{campus}$ provided to campus 402 is the sum of the grid power setpoint $P_{sp,grid}$, the battery power setpoint $P_{sp,bat}$, and the green power generation $P_{green}$.

In some embodiments, economic controller 610 generates and imposes one or more capacity constraints on the operation of central plant 406. For example, heating may be provided by heater subplant 202 and cooling may be provided by chiller subplant 206. The operation of heater subplant 202 and chiller subplant 206 may be defined by subplant curves for each of heater subplant 202 and chiller subplant 206. Each subplant curve may define the resource production of the subplant (e.g., tons refrigeration, kW heating, etc.) as a function of one or more resources consumed by the subplant (e.g., electricity, natural gas, water, etc.). Several examples of subplant curves which can be used by economic controller 610 are described in greater detail in U.S. patent application Ser. No. 14/634,609 filed Feb. 27, 2015.

Economic controller 610 can optimize the predictive cost function J subject to the constraints to determine optimal values for the decision variables $P_{CPO}$, $P_{RTU}$, $P_{VRF}$, $P_{AHU}$, $P_{grid}$, and $P_{bat}$, where $P_{campus}=P_{bat}+P_{grid}+P_{green}$. In some embodiments, economic controller 610 uses the optimal values for $P_{campus}$, $P_{bat}$, and/or $P_{grid}$ to generate power setpoints for tracking controller 612. The power setpoints can include battery power setpoints $P_{sp,bat}$, grid power setpoints $P_{sp,grid}$, central plant power setpoints $P_{sp,CPO}$, AHU power setpoints $P_{sp,AHU}$, VRF power setpoints $P_{sp,VRF}$, RTU power setpoints $P_{sp,RTU}$, and/or power setpoints for each subplant of central plant 406 for each of the time steps k in the optimization period. Economic controller 610 can provide the power setpoints to tracking controller 612.

In some embodiments, economic controller 610 is configured to determine an amount or portion of each power consumption value (e.g., $P_{campus}$, $P_{CPO}$, $P_{RTU}$, $P_{VRF}$, $P_{AHU}$, $P_{ChillerSubplant}$, $P_{HRCSubplant}$, $P_{HeaterSubplant}$, etc.) that consists of grid power, green power, and/or battery power. As discussed above, the green power $P_{green}$ and battery power $P_{bat}$ can be used to supplement the energy grid power $P_{grid}$ and may form a portion of each power consumption value. For example, each power consumption value may include a portion obtained from energy grid 412, a portion obtained from battery 414, and/or a portion obtained from green energy generation 408, as shown in the following equations:

$$P_{campus} = P_{campus,grid} + P_{campus,bat} + P_{campus,green}$$
$$P_{CPO} = P_{CPO,grid} + P_{CPO,bat} + P_{CPO,green}$$
$$P_{RTU} = P_{RTU,grid} + P_{RTU,bat} + P_{RTU,green}$$
$$P_{VRF} = P_{VRF,grid} + P_{VRF,bat} + P_{VRF,green}$$
$$P_{AHU} = P_{AHU,grid} + P_{AHU,bat} + P_{AHU,green}$$
$$P_{ChillerSubplant} = P_{ChillerSubplant,grid} + P_{ChillerSubplant,bat} + P_{ChillerSubplant,green}$$
$$P_{HRCSubplant} = P_{HRCSubplant,grid} + P_{HRCSubplant,bat} + P_{HRCSubplant,green}$$
$$P_{HeaterSubplant} = P_{HeaterSubplant,grid} + P_{HeaterSubplant,bat} + P_{HeaterSubplant,green}$$

where the subscript grid denotes the amount of power obtained from energy grid 412, the subscript bat denotes the amount of power obtained from battery 414, and the subscript green denotes the amount of power obtained from green energy generation 408.

Economic controller 610 can be configured to determine the portion of each power consumption value that consists of grid power, green power, and/or battery power at each time step of the optimization period. For example, in addition to determining the value of $P_{CPO}$ at each time step of the optimization period, economic controller 610 can be configured to determine the values of $P_{CPO,grid}$, $P_{CPO,bat}$, and $P_{CPO,green}$ at each time step. Similarly, in addition to determining the value of $P_{RTU}$ at each time step of the optimization period, economic controller 610 can be configured to determine the values of $P_{RTU,grid}$, $P_{RTU,bat}$, and $P_{RTU,green}$ at each time step. Economic controller 610 can be configured to determine the grid-specific portion, the battery-specific portion, and the green energy-specific portion of each of the power consumption values $P_{campus}$, $P_{CPO}$, $P_{RTU}$, $P_{VRF}$, $P_{AHU}$, $P_{ChillerSubplant}$, $P_{HRCSubplant}$, and $P_{HeaterSubplant}$. Each of the source-specific portions (i.e., the grid-specific portion, the battery-specific portion, and the green energy-specific portion) can be treated as decision variables in the optimization performed by economic controller 610.

Economic controller 610 can be configured to generate and impose constraints that equate the overall grid power $P_{grid}$ to the summation of the grid-specific components of each power consumption value $P_{CPO}$, $P_{RTU}$, $P_{AHU}$, and $P_{VRF}$. Similarly, economic controller 610 can be configured to generate and impose constraints that equate the overall battery power $P_{bat}$ to the summation of the battery-specific components of each power consumption value $P_{CPO}$, $P_{RTU}$, $P_{AHU}$, and $P_{VRF}$. Economic controller 610 can be configured to generate and impose constraints that equate the overall green power $P_{green}$ to the summation of the green power-specific components of each power consumption value $P_{CPO}$, $P_{RTU}$, $P_{AHU}$, and $P_{VRF}$. These constraints are shown in the following equations:

$$P_{grid} = P_{CPO,grid} + P_{RTU,grid} + P_{AHU,grid} + P_{VRF,grid}$$
$$P_{bat} = P_{CPO,bat} + P_{RTU,bat} + P_{AHU,bat} + P_{VRF,bat}$$
$$P_{green} = P_{CPO,green} + P_{RTU,green} + P_{AHU,green} + P_{VRF,green}$$

and can be used to constrain the optimization performed by economic controller 610.

In some embodiments, predictive controller 420 uses the source-specific portions of each power consumption value (i.e., the values indicating the amount of each power consumption value obtained from energy grid 412, battery 414, and green energy generation 408) over the duration of the optimization period to generate a user interface that indicates the power consumption state of each subsystem or device of building energy system 400. For example, the user interface may include a meter or other graphic that indicates the amount of each power value that consists of grid power and/or the amount of each power value that consists of battery power or green power. Several examples of such user interfaces are shown in FIGS. 7-11.

Tracking Controller

Tracking controller 612 can use the optimal power setpoints generated by economic controller 610 (e.g., $P_{sp,bat}$, $P_{sp,grid}$, $P_{sp,CPO}$, $P_{sp,AHU}$, $P_{sp,VRF}$, $P_{sp,RTU}$, $P_{sp,campus}$, etc.) to determine optimal temperature setpoints (e.g., a zone temperature setpoint $T_{sp,zone}$, a supply air temperature setpoint $T_{sp,sa}$, etc.) and an optimal battery charge or discharge rate (i.e., $Bat_{C/D}$). In some embodiments, tracking controller 612 generates a zone temperature setpoint $T_{sp,zone}$ and/or a supply air temperature setpoint $T_{sp,sa}$ that are predicted to achieve the power setpoints for campus 402 (e.g., $P_{sp,CPO}$, $P_{sp,AHU}$, $P_{sp,VRF}$, $P_{sp,RTU}$, $P_{sp,campus}$). In other words, tracking controller 612 may generate a zone temperature setpoint $T_{sp,zone}$ and/or a supply air temperature setpoint $T_{sp,sa}$ that cause campus 402 to consume the optimal amount of power $P_{campus}$ determined by economic controller 610.

In some embodiments, tracking controller 612 relates the power consumption of campus 402 to the zone temperature $T_{zone}$ and the zone temperature setpoint $T_{sp,zone}$ using a power consumption model. For example, tracking controller 612 can use a model of equipment controller 614 to determine the control action performed by equipment controller 614 as a function of the zone temperature $T_{zone}$ and the zone temperature setpoint $T_{sp,zone}$. An example of such a zone regulatory controller model is shown in the following equation:

$$v_{air} = f_3(T_{zone}, T_{sp,zone})$$

where $v_{air}$ is the rate of airflow to the building zone (i.e., the control action).

In some embodiments, $v_{air}$ depends on the speed of a fan of an AHU or RTU used to provide airflow to buildings 404 and may be a function of $P_{AHU}$ or $P_{RTU}$. Tracking controller 612 can use an equipment model or manufacturer specifications for the AHU or RTU to translate $v_{air}$ into a corresponding power consumption value $P_{AHU}$ or $P_{RTU}$. Accordingly, tracking controller 612 can define the power consumption $P_{campus}$ of campus 402 as a function of the zone temperature $T_{zone}$ and the zone temperature setpoint $T_{sp,zone}$. An example of such a model is shown in the following equation:

$$P_{campus} = f_4(T_{zone}, T_{sp,zone})$$

The function $f_4$ can be identified from data. For example, tracking controller 612 can collect measurements of $P_{campus}$ and $T_{zone}$ and identify the corresponding value of $T_{sp,zone}$. Tracking controller 612 can perform a system identification process using the collected values of $P_{campus}$, $T_{zone}$, and $T_{sp,zone}$ as training data to determine the function $f_4$ that defines the relationship between such variables.

Tracking controller 612 may use a similar model to determine the relationship between the total power consumption $P_{campus}$ of campus 402 and the supply air temperature setpoint $T_{sp,sa}$. For example, tracking controller 612 can define the power consumption $P_{campus}$ of campus 402 as a function of the zone temperature $T_{zone}$ and the supply air temperature setpoint $T_{sp,zone}$. An example of such a model is shown in the following equation:

$$P_{campus} = f_5(T_{zone}, T_{sp,sa})$$

The function $f_5$ can be identified from data. For example, tracking controller 612 can collect measurements of $P_{campus}$ and $T_{zone}$ and identify the corresponding value of $T_{sp,sa}$. Tracking controller 612 can perform a system identification process using the collected values of $P_{campus}$, $T_{zone}$, and $T_{sp,sa}$ as training data to determine the function $f_5$ that defines the relationship between such variables.

Tracking controller 612 can use the relationships between $P_{campus}$, $T_{sp,zone}$, and $T_{sp,sa}$ to determine values for $T_{sp,zone}$ and $T_{sp,sa}$. For example, tracking controller 612 can receive the value of $P_{campus}$ as an input from economic controller 610 (i.e., $P_{sp,campus}$) and can use the value of $P_{campus}$ to determine corresponding values of $T_{sp,zone}$ and $T_{sp,sa}$. Tracking controller 612 can provide the values of $T_{sp,zone}$ and $T_{sp,sa}$ as outputs to equipment controller 614.

In some embodiments, tracking controller 612 uses the battery power setpoint $P_{sp,bat}$ to determine the optimal rate $Bat_{C/D}$ at which to charge or discharge battery 414. For example, the battery power setpoint $P_{sp,bat}$ may define a power value (kW) which can be translated by tracking controller 612 into a control signal for battery power inverter 416 and/or equipment controller 614. In other embodiments, the battery power setpoint $P_{sp,bat}$ is provided directly to battery power inverter 416 and used by battery power inverter 416 to control the battery power $P_{bat}$.

Equipment Controller

Equipment controller 614 can use the optimal temperature setpoints $T_{sp,zone}$ or $T_{sp,sa}$ generated by tracking controller 612 to generate control signals for campus 402. The control signals generated by equipment controller 614 may drive the actual (e.g., measured) temperatures $T_{zone}$ and/or $T_{sa}$ to the setpoints. Equipment controller 614 can use any of a variety of control techniques to generate control signals for campus 402. For example, equipment controller 614 can use state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for campus 402.

The control signals may include on/off commands, speed setpoints for fans or compressors, position setpoints for actuators and valves, or other operating commands for individual devices of building equipment and/or central plant equipment. In some embodiments, equipment controller 614 uses a feedback control technique (e.g., PID, ESC, MPC, etc.) to adjust the operation of central plant 406 to drive the measured temperatures $T_{zone}$ and/or $T_{sa}$ to the temperature setpoints $T_{sp,zone}$ and/or $T_{sp,sa}$. Similarly, equipment controller 614 can use a feedback control technique to control the equipment of buildings 404 (e.g., AHUs, RTUs, VRF equipment, etc.) to drive the measured temperatures $T_{zone}$ and/or $T_{sa}$ to the temperature setpoints $T_{sp,zone}$ and/or $T_{sp,sa}$. Equipment controller 614 can provide the control signals to the equipment of campus 402 to control the operation of such equipment, thereby causing the equipment of campus 402 to affect the zone temperature $T_{zone}$ and/or the supply air temperature $T_{sa}$.

In some embodiments, equipment controller 614 is configured to provide control signals to battery power inverter 416. The control signals provided to battery power inverter 416 can include a battery power setpoint $P_{sp,bat}$ and/or the optimal charge/discharge rate $Bat_{C/D}$. Equipment controller 614 can be configured to operate battery power inverter 416 to achieve the battery power setpoint $P_{sp,bat}$. For example, equipment controller 614 can cause battery power inverter 416 to charge battery 414 or discharge battery 414 in accordance with the battery power setpoint $P_{sp,bat}$.

User Interfaces

Referring now to FIGS. 7-11, several user interfaces 700-1100 which can be generated by predictive controller 420 are shown, according to an exemplary embodiment. As discussed above, economic controller 610 can be configured to determine the portion of each power consumption value (e.g., $P_{campus}$, $P_{CPO}$, $P_{RTU}$, $P_{VRF}$, $P_{AHU}$, $P_{ChillerSubplant}$, $P_{HRCSubplant}$, $P_{HeaterSubplant}$, etc.) that consists of grid power, green power, and/or battery power at each time step of the optimization period. User interfaces 700-1100 can be used to convey to a user the relative portions of each power consumption value that consist of grid power, green power, and/or battery power.

Figure 7:
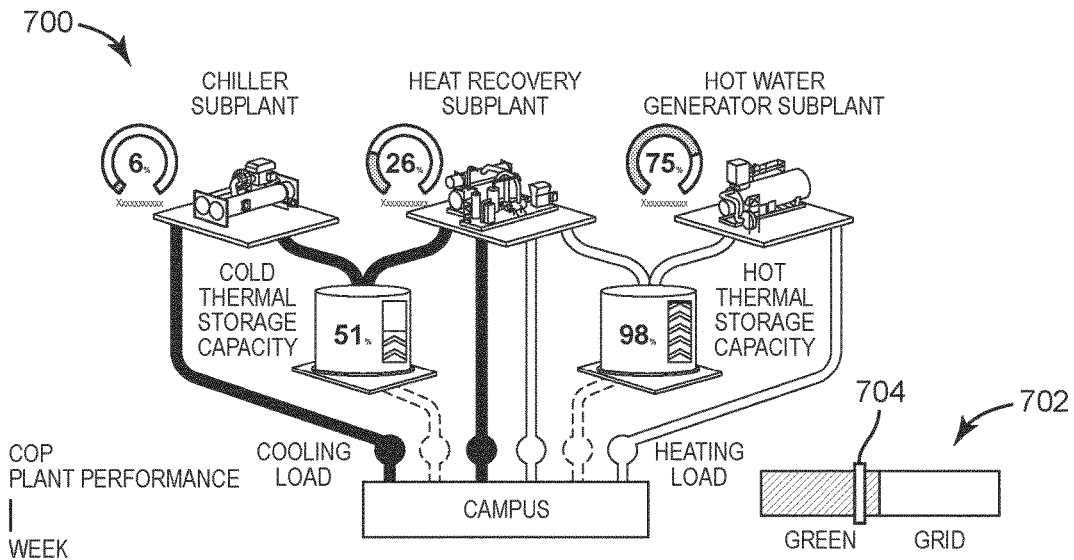
FIG. 7 is a drawing of a user interface which can be generated by the predictive controller of FIG. 4, according to an exemplary embodiment.

Referring specifically to FIG. 7, an interface 700 illustrating the heating and cooling load served by central plant 406 is shown, according to an exemplary embodiment. Interface 700 is shown to include a plurality of subplants corresponding to the subplants within central plant 406 (e.g., a chiller subplant, a heat recovery chiller subplant, a hot water generator subplant, thermal energy storage, etc.). Interface 700 may indicate the utilization of each subplant at a particular time. For example, interface 700 may indicate the percentage of the maximum capacity of each subplant at which the subplant is currently operating. Interface 700 may also indicate the charge level of each thermal energy storage tank.

Interface 700 is shown to include an energy meter 702. Energy meter 702 indicates the relative portion of the power consumption of central plant 406 that consists of green energy and grid energy. In some embodiments, the "green energy" shown in interface 700 includes both energy discharged from battery 414 and energy provided by green energy generation 408. In other embodiments, the energy discharged from battery 414 and the energy provided by green energy generation 408 may be shown separately in interface 700. Grid energy may include energy obtained from energy grid 412. Slider 704 indicates the relative proportion of each type of energy used to power central plant 406. For example, central plant 406 may be powered entirely by green energy if slider 704 is located at the far left side of energy meter 702, whereas central plant 406 may be powered entirely by grid energy if slider 704 is located at the far right side of energy meter 702. Intermediate positions of slider 704 indicate that central plant 406 is powered partially by green energy and partially be grid energy.

Figure 8:
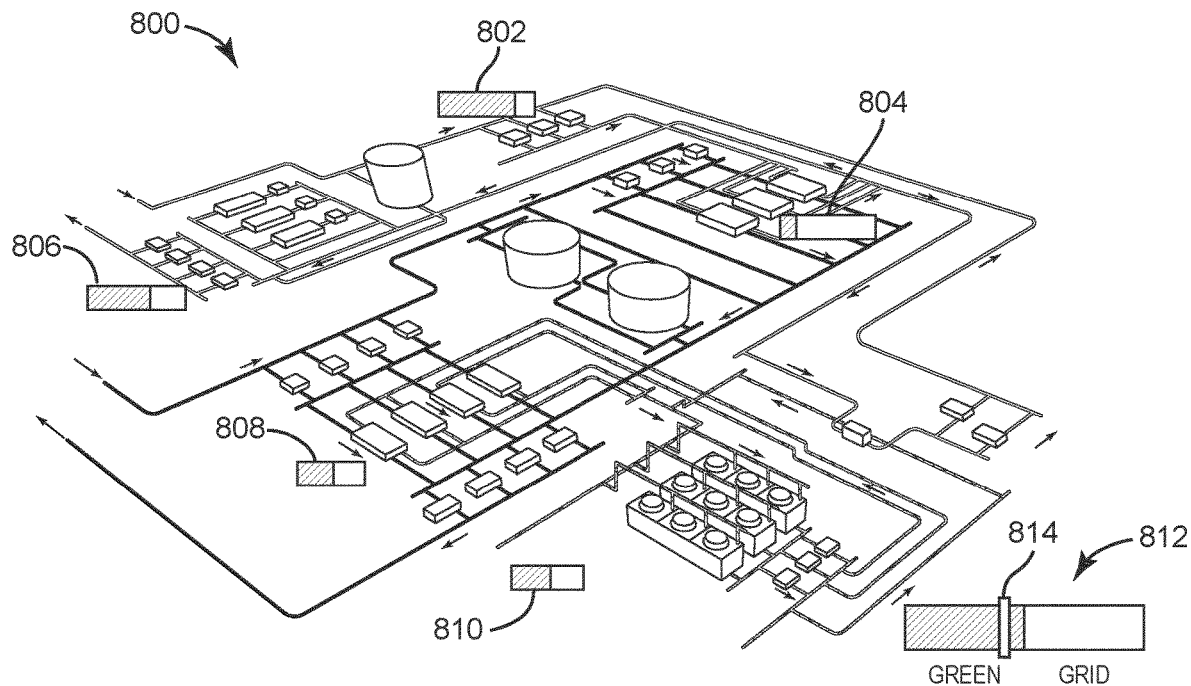
FIG. 8 is a drawing of another user interface which can be generated by the predictive controller of FIG. 4, according to an exemplary embodiment.

Referring now to FIG. 8, an interface 800 illustrating the various subplants within central plant 406 is shown, according to an exemplary embodiment. Interface 800 is shown to include a plurality of subplants corresponding to the subplants within central plant 406 (e.g., a chiller subplant, a heat recovery chiller subplant, a hot water generator subplant, a cooling tower subplant, thermal energy storage, etc.). Energy meters 802-810 are positioned adjacent to each subplant. Each of energy meters 802-810 corresponds to one of the subplants of central plant 406 and indicates the relative portion of the power consumption of that subplant that consists of green energy and grid energy. In some embodiments, the "green energy" shown in interface 800 includes both energy discharged from battery 414 and energy provided by green energy generation 408. In other embodiments, the energy discharged from battery 414 and the energy provided by green energy generation 408 may be shown separately in interface 800. Grid energy may include energy obtained from energy grid 412.

Interface 800 is shown to include an energy meter 812. Energy meter 812 indicates the relative portion of the power consumption of central plant 406 that consists of green energy and grid energy. Slider 814 indicates the relative proportion of each type of energy used to power central plant 406. For example, central plant 406 may be powered entirely by green energy if slider 814 is located at the far left side of energy meter 812, whereas central plant 406 may be powered entirely by grid energy if slider 814 is located at the far right side of energy meter 812. Intermediate positions of slider 814 indicate that central plant 406 is powered partially by green energy and partially be grid energy.

Figure 9:
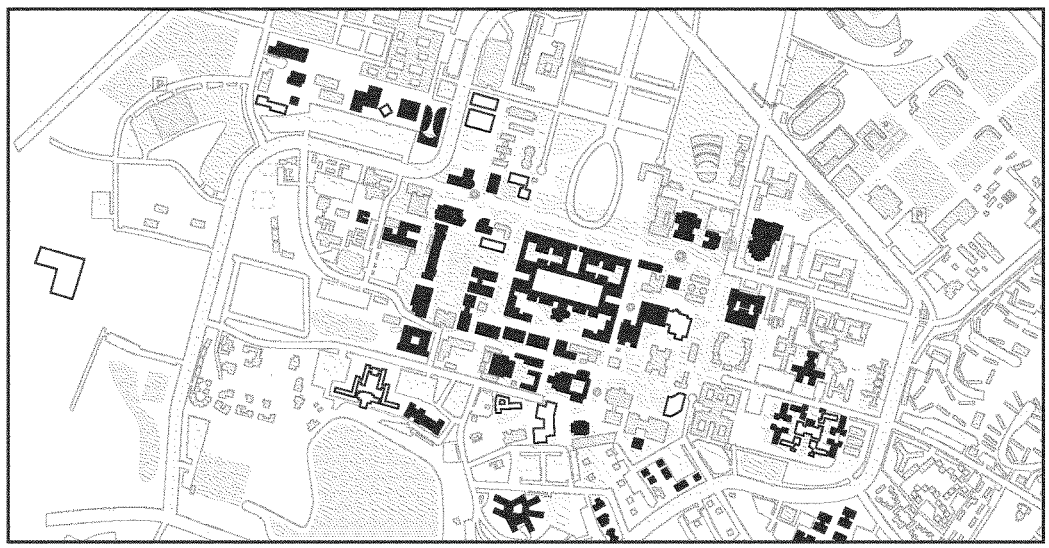
FIG. 9 is a drawing of another user interface which can be generated by the predictive controller of FIG. 4, according to an exemplary embodiment.

Referring now to FIG. 9, an interface 900 illustrating the various buildings of campus 402 is shown, according to an exemplary embodiment. Interface 900 is shown to include several buildings, each of which may correspond to one of buildings 404. Each building may be colored, highlighted, or otherwise marked to indicate relative portion of the power consumption of the building that consists of green energy and grid energy. For example, a building may be colored a first color (e.g., green) if the building is powered entirely by green energy, whereas the building may be colored a second color (e.g., blue) if the building is powered partially by green energy and partially be grid energy, and the building may be colored a third color (e.g., red) if the building is powered entirely by grid energy.

Figure 10:
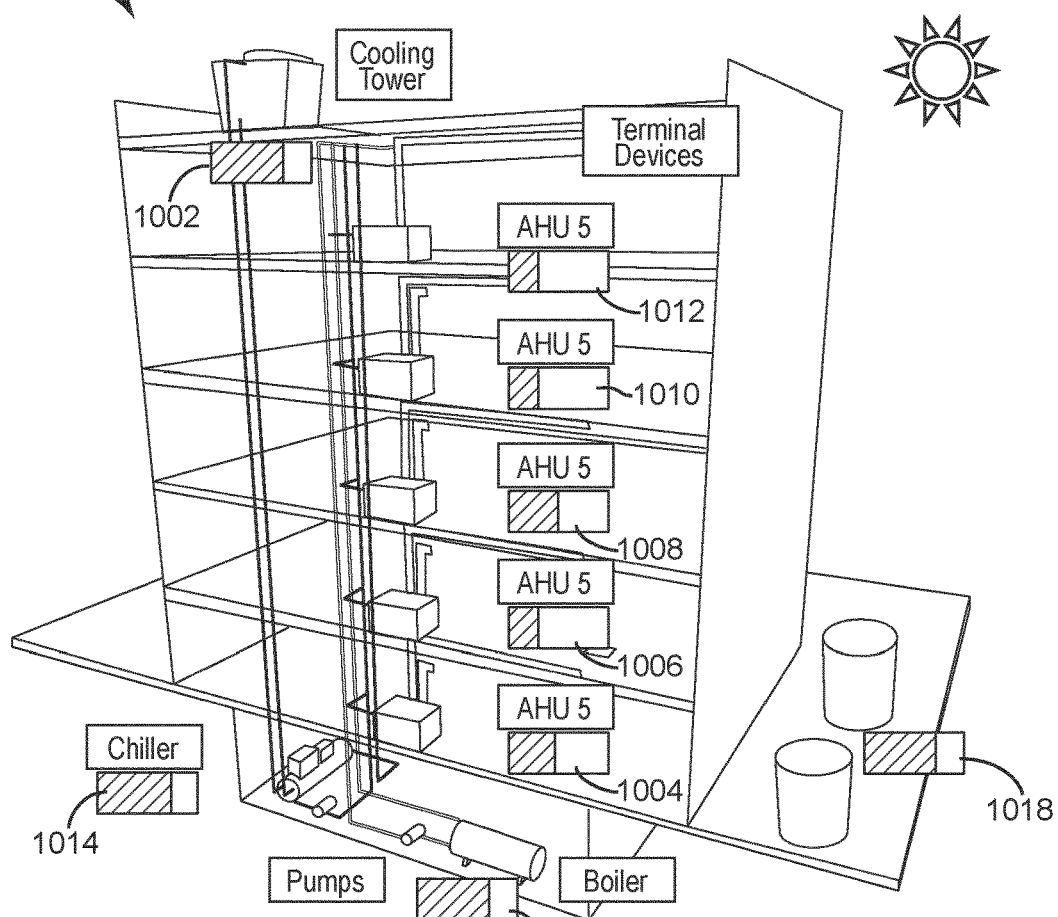
FIG. 10 is a drawing of another user interface which can be generated by the predictive controller of FIG. 4, according to an exemplary embodiment.

Referring now to FIG. 10, an interface 1000 illustrating the building equipment within a building is shown, according to an exemplary embodiment. Interface 1000 is shown to include various devices of building equipment including a RTU, several AHUs, a chiller, pumps, a boiler, and battery storage. Energy meters 1002-1018 are positioned adjacent to each device of building equipment in interface 1000. Each of energy meters 1002-1018 corresponds to one of the devices of building equipment and indicates the relative portion of the power consumption of that device that consists of green energy and grid energy. In some embodiments, the "green energy" shown in interface 1000 includes both energy discharged from battery 414 and energy provided by green energy generation 408. In other embodiments, the energy discharged from battery 414 and the energy provided by green energy generation 408 may be shown separately in interface 1000. Grid energy may include energy obtained from energy grid 412.

Figure 11:
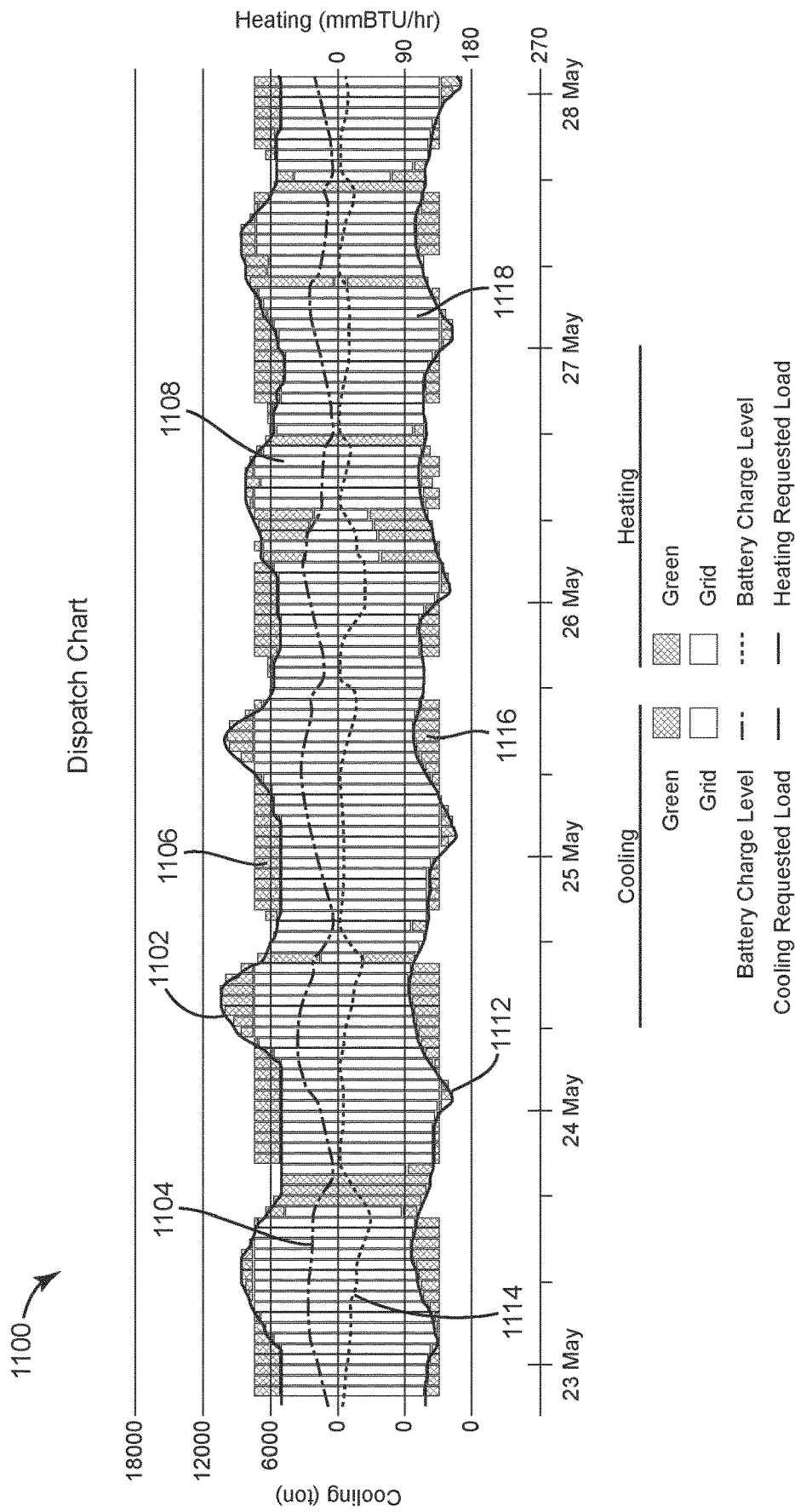
FIG. 11 is a drawing of another user interface which can be generated by the predictive controller of FIG. 4, according to an exemplary embodiment.

Referring now to FIG. 11, an interface 1100 illustrating a dispatch chart is shown, according to an exemplary embodiment. The top half of the dispatch chart corresponds to cooling, whereas the bottom half of the dispatch chart corresponds to heating. The midline between the top and bottom halves corresponds to zero load/power for both halves. Positive cooling values are shown as displacement above the midline, whereas positive heating values are shown as displacement below the midline. Lines 1002 and 1012 represent the requested cooling load and the requested heating load, respectively, at each time step of the optimization period. Lines 1004 and 1014 represent the charge level of batteries used to power the cooling equipment (e.g., a chiller subplant) and the heating equipment (e.g., a heater subplant) over the duration of the optimization period.

As discussed above, economic controller 610 can be configured to determine optimal power setpoints for each time step of the optimization period. The results of the optimization performed by economic controller 610 can be represented in the dispatch chart. For example, the dispatch chart is shown to include a vertical column for each time step of the optimization period. Each column may include one or more bars representing the power setpoints determined by economic controller 610 for the corresponding time step. The color of each bar indicates the type of power setpoint. For example, gray bars 1008 and 1018 may indicate the grid power setpoint (e.g., $P_{sp,grid}$) whereas green bars 1006 and 1016 may indicate the battery power setpoint (e.g., $P_{sp,bat}$). The height of each bar indicates the magnitude of the corresponding power setpoint at that time step.

Green bars 1006 positioned above requested cooling line 1002 indicate that the cooling equipment battery is charging (i.e., excess energy used to charge the battery), whereas green bars 1006 positioned below requested cooling line 1002 indicate that the cooling equipment battery is discharging (i.e., battery power used to satisfy part of the requested cooling load). The charge level of the cooling equipment battery increases when the cooling equipment battery is charging and decreases when the cooling equipment battery is discharging.

Similarly, green bars 1016 positioned below requested heating line 1012 indicate that the heating equipment battery is charging (i.e., excess energy used to charge the battery), whereas green bars 1016 positioned above requested heating line 1012 indicate that the heating equipment battery is discharging (i.e., battery power used to satisfy part of the requested heating load). The charge level of the heating equipment battery increases when the heating equipment battery is charging and decreases when the heating equipment battery is discharging.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A predictive controller for a building energy system, the building energy system comprising HVAC equipment comprising waterside equipment and airside equipment, the predictive controller comprising one or more processing circuits configured to:
    obtain a function that defines a control objective or a constraint based on an amount of energy consumed by both the waterside equipment and the airside equipment during each time step of a time period as a summation of multiple equipment-specific energy components comprising:
        a waterside energy component indicating an amount of energy consumed by the waterside equipment during the time step; and
        an airside energy component indicating an amount of energy consumed by the airside equipment during the time step;
    perform a predictive control process using the function to determine values of the equipment-specific energy components during each time step of the time period, wherein the predictive control process comprises predicting the amount of energy consumed by both the waterside equipment and the airside equipment during the time period based on the values of the equipment-specific energy components; and
    operate the waterside equipment and the airside equipment using the values of the equipment-specific energy components.

2. The predictive controller of claim 1, wherein:
    the function defines the control objective based on the amount of energy consumed by both the waterside equipment and the airside equipment during each time step of the time period as the summation of the equipment-specific energy components; and
    performing the predictive control process comprises performing an optimization of the function to determine the values of the equipment-specific energy components during each time step of the time period.

3. The predictive controller of claim 1, wherein:
    the function defines the constraint based on the amount of energy consumed by both the waterside equipment and the airside equipment during each time step of the time period as the summation of the equipment-specific energy components; and
    performing the predictive control process comprises performing the predictive control process subject to the constraint.

4. The predictive controller of claim 1, wherein:
    the time period is a future time period comprising a plurality of future time steps; and
    performing the predictive control process comprises determining time step-specific values of the equipment-specific energy components for each of the plurality of future time steps occurring during the future time period.

5. The predictive controller of claim 1, wherein the airside energy component comprises at least one of:
    an air handler unit (AHU) energy component indicating an amount of energy consumed by one or more AHUs of the airside equipment during the time step; or
    a rooftop unit (RTU) energy component indicating an amount of energy consumed by one or more RTUs of the airside equipment during the time step.

6. The predictive controller of claim 1, wherein the one or more processing circuits are configured to:
    obtain energy pricing data defining a cost per unit of the energy consumed by both the waterside equipment and the airside equipment; and
    use the energy pricing data as inputs to the predictive control process.

7. The predictive controller of claim 1, wherein the one or more processing circuits are configured to:
    determine temperature setpoints for one or more building zones based on the values of the equipment-specific energy components; and
    operate the waterside equipment and the airside equipment using the temperature setpoints.

8. The predictive controller of claim 1, wherein the one or more processing circuits are configured to:
    obtain a second function that defines a total electric load to be served by the building energy system during each time step of the time period as a summation of multiple source-specific energy components comprising:
        a first energy component indicating a first amount of energy to obtain from a first energy source during the time step; and a second energy component indicating a second amount of energy to obtain from a second energy source during the time step; and
perform the predictive control process using the second function to determine values of the source-specific energy components during each time step of the time period.

9. The predictive controller of claim 8, wherein the multiple source-specific energy components comprise at least two of:
a grid energy component indicating an amount of grid energy to obtain from an energy grid during the time step;
a green energy component indicating an amount of green energy to obtain from green energy generation during the time step; and
a battery energy component indicating an amount of electric energy to store in a battery or discharge from the battery during the time step.

10. A method for operating a building energy system, the building energy system comprising HVAC equipment comprising waterside equipment and airside equipment, the method comprising:
obtaining a function that defines a control objective or a constraint based on an amount of energy consumed by both the waterside equipment and the airside equipment during each time step of a time period as a summation of multiple equipment-specific energy components comprising:
a waterside energy component indicating an amount of energy consumed by the waterside equipment during the time step; and
an airside energy component indicating an amount of energy consumed by the airside equipment during the time step;
performing a predictive control process using the function to determine values of the equipment-specific energy components during each time step of the time period, wherein the predictive control process comprises predicting the amount of energy consumed by both the waterside equipment and the airside equipment during the time period based on the values of the equipment-specific energy components; and
operating the waterside equipment and the airside equipment using the values of the equipment-specific energy components.

11. The method of claim 10, wherein:
the function defines the control objective based on the amount of energy consumed by both the waterside equipment and the airside equipment during each time step of the time period as the summation of the equipment-specific energy components; and
performing the predictive control process comprises performing an optimization of the function to determine the values of the equipment-specific energy components during each time step of the time period.

12. The method of claim 10, wherein:
the function defines the constraint based on the amount of energy consumed by both the waterside equipment and the airside equipment during each time step of the time period as the summation of the equipment-specific energy components; and
performing the predictive control process comprises performing the predictive control process subject to the constraint.

13. The method of claim 10, wherein:
the time period is a future time period comprising a plurality of future time steps; and
performing the predictive control process comprises determining time step-specific values of the equipment-specific energy components for each of the plurality of future time steps occurring during the future time period.

14. The method of claim 10, wherein the airside energy component comprises at least one of:
an air handler unit (AHU) energy component indicating an amount of energy consumed by one or more AHUs of the airside equipment during the time step; or
a rooftop unit (RTU) energy component indicating an amount of energy consumed by one or more RTUs of the airside equipment during the time step.

15. The method of claim 10, further comprising:
obtaining a second function that defines a total electric load to be served by the building energy system during each time step of the time period as a summation of multiple source-specific energy components comprising:
a first energy component indicating a first amount of energy to obtain from a first energy source during the time step; and
a second energy component indicating a second amount of energy to obtain from a second energy source during the time step; and
performing the predictive control process using the second function to determine values of the source-specific energy components during each time step of the time period.

16. A method for operating a building energy system, the building energy system comprising HVAC equipment comprising waterside equipment and airside equipment, the method comprising:
performing a predictive control process using a function that defines a control objective or a constraint based on an amount of energy consumed by both the waterside equipment and the airside equipment during each time step of a future time period as a summation of multiple equipment-specific energy components to determine values of the equipment-specific energy components for each time step of the future time period, wherein the predictive control process comprises predicting the amount of energy consumed by both the waterside equipment and the airside equipment during the time period based on the values of the equipment-specific energy components, the equipment-specific energy components comprising:
a waterside energy component indicating an amount of energy consumed by the waterside equipment during the time step; and
an airside energy component indicating an amount of energy consumed by the airside equipment during the time step; and
operating the waterside equipment and the airside equipment using the values of the equipment-specific energy components.

17. The method of claim 16, wherein:
the function defines the control objective based on the amount of energy consumed by both the waterside equipment and the airside equipment during each time step of the time period as the summation of the equipment-specific energy components; and
performing the predictive control process comprises performing an optimization of the function to determine the values of the equipment-specific energy components during each time step of the time period.

18. The method of claim 16, wherein:
the function defines the constraint based on the amount of energy consumed by both the waterside equipment and the airside equipment during each time step of the time period as the summation of the equipment-specific energy components; and
performing the predictive control process comprises performing the predictive control process subject to the constraint.

19. The method of claim 16, wherein:
the future time period comprises a plurality of future time steps; and
performing the predictive control process comprises determining time step-specific values of the equipment-specific energy components for each of the plurality of future time steps occurring during the future time period.

20. The method of claim 16, wherein the airside energy component comprises at least one of:
an air handler unit (AHU) energy component indicating an amount of energy consumed by one or more AHUs of the airside equipment during the time step; or
a rooftop unit (RTU) energy component indicating an amount of energy consumed by one or more RTUs of the airside equipment during the time step.

* * * * *